(12) United States Patent
Laroia et al.

(10) Patent No.: US 7,936,831 B2
(45) Date of Patent: May 3, 2011

(54) METHODS AND APPARATUS FOR IMPLEMENTING AND USING AN IN-BAND RATE INDICATOR

(75) Inventors: Rajiv Laroia, Basking Ridge, NJ (US); Hui Jin, Annandale, NJ (US); Junyi Li, Bedminster, NJ (US); Frank A. Lane, Asbury, NJ (US); Tom Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1310 days.

(21) Appl. No.: 11/229,040

(22) Filed: Sep. 16, 2005

(65) Prior Publication Data

US 2007/0019717 A1 Jan. 25, 2007

Related U.S. Application Data

(60) Provisional application No. 60/701,313, filed on Jul. 20, 2005.

(51) Int. Cl.
*H04L 27/00* (2006.01)
(52) U.S. Cl. ........................................ 375/259; 375/295
(58) Field of Classification Search .................. 375/259, 375/260, 265, 295; 370/347
See application file for complete search history.

(56) References Cited

U.S. PATENT DOCUMENTS

| 7,092,737 B2 * | 8/2006 | Horng et al. ............... 455/562.1 |
| 7,142,864 B2 | 11/2006 | Laroia et al. | |
| 2003/0027568 A1 * | 2/2003 | Berger .......................... 455/429 |
| 2003/0189917 A1 | 10/2003 | Sudo | |
| 2004/0190484 A1 * | 9/2004 | Shin et al. ..................... 370/347 |
| 2005/0169211 A1 * | 8/2005 | Malladi et al. ................ 370/328 |
| 2007/0248015 A1 * | 10/2007 | Yano et al. .................... 370/235 |

FOREIGN PATENT DOCUMENTS

| EP | 1 524 790 A | 4/2005 |
| JP | 09139980 | 5/1997 |
| JP | 2001515301 | 9/2001 |
| JP | 20044282542 | 10/2004 |
| WO | WO2005048563 | 5/2005 |

OTHER PUBLICATIONS

Nokia: "HSDPA related signaling parameters in downlink—Tdoc 12A010005" TSG-RAN WG1/WG2 ADHOC on HSDPA, Apr. 5-6, 2001, XP002290532, 5 pages.

(Continued)

*Primary Examiner* — Emmanuel Bayard
(74) *Attorney, Agent, or Firm* — Donald C. Kordich

(57) ABSTRACT

Downlink traffic channel data rate options and methods of indicating to a wireless terminal a utilized downlink data rate option are described. The downlink traffic channel rate option for a segment is conveyed using an assignment signal and/or a block in the downlink traffic channel segment which is not used for user data. Downlink segment assignment signals in some implementations allocate fewer bits for rate option indication than are required to uniquely identify each option. In some implementations low rate options, e.g., using QPSK, are uniquely identified via assignment signals. Higher rate options, e.g., using QAM16 modulation, are conveyed via the distinct information block in the downlink traffic segment using a first coding/modulation method. Still higher rate options, e.g., using QAM16, QAM64, or QAM256, are conveyed via the information block in the segment using a second coding/modulation method which is applied to the rate option information.

58 Claims, 18 Drawing Sheets

OTHER PUBLICATIONS

Motorola: "HSDPA signaling requirements" TSG-RAN Working Group 2, Jan. 15-19, 2001 XP002290533, 2 pages.
Samsung Electronics: "R1-01-0874" TSG-RAN WG1 Meeting #21, Aug. 27-31, 2001 XP002291724, 10 pages.
International Search Report for PCT/US2006/027761, 4 pages, dated Jan. 23, 2007.
Written Opinion of the International Searching Authority for PCT/US2006/027761, 5 pages, dated Jan. 23, 2007.
Notification of Transmittal of the International Preliminary Report on Patentability, for PCT International Application No. PCT/US2006/027761, dated Sep. 13, 2007 pp. 1-7.

* cited by examiner

| DOWNLINK TRAFFIC CHANNEL RATE OPTION | NUMBER OF MAC FRAMES | NUMBER OF INFORMATION BITS (k) | CODEWORD LENGTH (n) | MODULATION CONSTELLATION |
|---|---|---|---|---|
| 0 | 1 | 224 | 1344 | QPSK |
| 1 | 2 | 432 | 1344 | QPSK |
| 2 | 3 | 640 | 1344 | QPSK |
| 3 | 4 | 848 | 2624 | QAM16 |
| 4 | 5 | 1056 | 2624 | QAM16 |
| 5 | 6 | 1264 | 2624 | QAM16 |
| 6 | 8 | 1680 | 2624 | QAM16 |
| 7 | 10 | 2096 | 3936 | QAM64 |
| 8 | 12 | 2512 | 3936 | QAM64 |
| 9 | 14 | 2928 | 5248 | QAM256 |
| 10 | 18 | 3760 | 5248 | QAM256 |

FIGURE 4

| DL TRAFFIC CHANNEL ASSIGNMENT ||
|---|---|
| RATE OPTION SUBFIELD VALUE (2 BITS) | NOTES |
| 00 | RATE OPTION 0 USED IN DL TRAFFIC CHANNEL SEGMENT |
| 01 | RATE OPTION 1 USED IN DL TRAFFIC CHANNEL SEGMENT |
| 10 | RATE OPTION 2 USED IN DL TRAFFIC CHANNEL SEGMENT |
| 11 | ONE OF RATE OPTION 3-10 USED IN DL TRAFFIC CHANNEL SEGMENT; ACTUAL RATE OPTION SIGNALED IN SPECIAL INFORMATION BLOCK OF DL TRAFFIC CHANNEL SEGMENT |

FIGURE 5

| DOWNLINK TRAFFIC CHANNEL SEGMENT RATE OPTION | SPECIAL INFORMATION BLOCK IN DL TRAFFIC CHANNEL SEGMENT ||
|---|---|---|
| | YES / NO | FORMAT TYPE |
| 0 - 2 | NO | N/A |
| 3 - 4 | YES | FORMAT 1 |
| 5-10 | YES | FORMAT 2 |

FIGURE 9

| SPECIAL INFORMATION BLOCK IN DL TRAFFIC CHANNEL SEGMENT FORMAT 1 ||||
|---|---|---|---|
| PARAMETER | SIZE (BITS) | VALUE | NOTES |
| RATE OPTION INDICATOR | 1 | 0 | DOWNLINK TRAFFIC CHANNEL SEGMENT USES RATE OPTION 3 |
| | | 1 | DOWNLINK TRAFFIC CHANNEL SEGMENT USES RATE OPTION 4 |
| TRANSMISSION POWER INDICATOR | 4 | INTEGER VALUE, n, IN RANGE 0..15 | TRANSMISSION POWER OF DOWNLINK TRACFFIC CHANNEL SEGMENT. VALUE IN FIELD IS A NON-NEGATIVE INTERGER n INDICATING THAT PER TONE RELATIVE TRANSMISSION POWER OF THE DOWNLINK TRAFFIC CHANNEL SEGMENT, DOWNLINK TRAFFIC CHANNEL POWER OFFSET = n/4 + 2 dB |

FIGURE 10

| 1100 → | 1102 ↓ | 1104 ↓ | 1106 ↓ | 1108 ↓ | |
|---|---|---|---|---|---|
| SPECIAL INFORMATION BLOCK IN DL TRAFFIC CHANNEL SEGMENT FORMAT 2 ||||||
| PARAMETER | SIZE (BITS) | VALUE | NOTES ||
| RATE OPTION INDICATOR | 3 | 0 | DOWNLINK TRAFFIC CHANNEL SEGMENT USES RATE OPTION 5 | ← 1110 |
| | | 1 | DOWNLINK TRAFFIC CHANNEL SEGMENT USES RATE OPTION 6 | ← 1112 |
| | | 2 | DOWNLINK TRAFFIC CHANNEL SEGMENT USES RATE OPTION 7 | ← 1114 |
| | | 3 | DOWNLINK TRAFFIC CHANNEL SEGMENT USES RATE OPTION 8 | ← 1116 |
| | | 4 | DOWNLINK TRAFFIC CHANNEL SEGMENT USES RATE OPTION 9 | ← 1118 |
| | | 5 | DOWNLINK TRAFFIC CHANNEL SEGMENT USES RATE OPTION 10 | ← 1120 |
| | | 6 | RESERVED | ← 1122 |
| | | 7 | RESERVED | ← 1124 |
| TRANSMISSION POWER INDICATOR | 5 | INTEGER VALUE, n, IN RANGE 0..31 | TRANSMISSION POWER OF DOWNLINK TRACFFIC CHANNEL SEGMENT. VALUE IN FIELD IS A NON-NEGATIVE INTERGER n INDICATING THAT PER TONE RELATIVE TRANSMISSION POWER OF THE DOWNLINK TRAFFIC CHANNEL SEGMENT, DOWNLINK TRAFFIC CHANNEL POWER OFFSET = n/4 + 2 dB | ← 1126 |

FIGURE 11

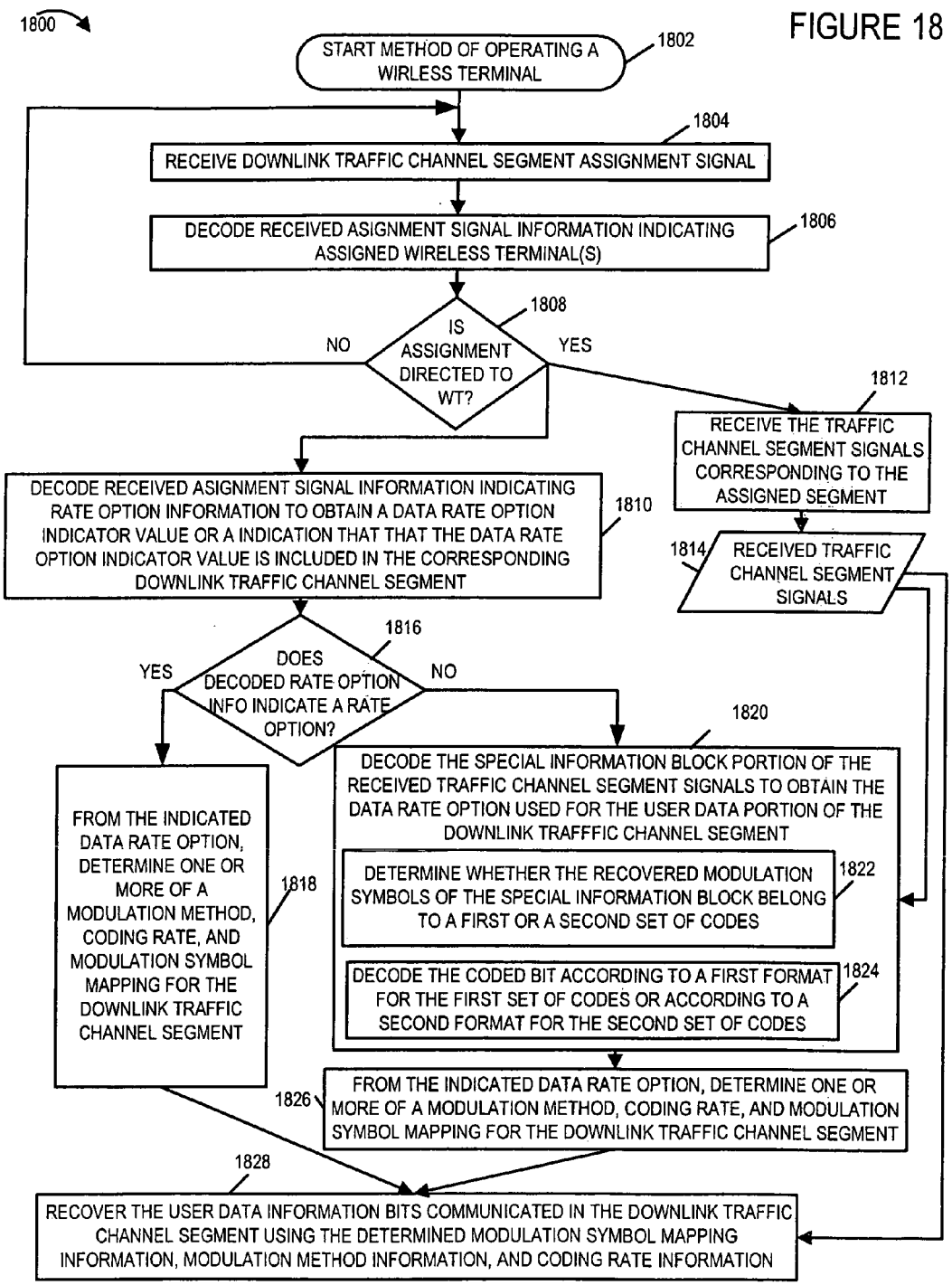

METHODS AND APPARATUS FOR IMPLEMENTING AND USING AN IN-BAND RATE INDICATOR

RELATED APPLICATIONS

The present application claims the benefit of U.S. Provisional Patent Application Ser. No. 60/701,313, filed on Jul. 20, 2005 which is hereby expressly incorporated by reference.

FIELD OF THE INVENTION

The present invention relates to methods and apparatus for indicating data rate option information while various exemplary embodiments are more particularly directed to indicating and using downlink data rate option information in a wireless communications system.

BACKGROUND OF THE INVENTION

In order to efficiently perform downlink traffic channel signaling in a wireless communications system, where a base station communicates with a plurality of wireless terminals, situated at different locations with different channel conditions and different levels of interference at any given time, it is beneficial to support a large number of data rate options for downlink traffic channel segments. Typically, in wireless communications systems supporting multiple downlink traffic channel data rate options which may change on a segment to segment basis, the data rate option for a given segment is uniquely identified in a field of an assignment signal corresponding to the downlink traffic channel segment. However, as the number of supported data rate options increases, the number of bits required to be dedicated in the assignment signal to uniquely indicate the assigned rate option increases, representing an undesirable increase in overhead.

In view of the above discussion, it would be beneficial if new methods and apparatus allowed for the supporting of a large number of downlink traffic channel data rate options, yet limiting the amount of overhead used to convey data rate information. Methods and apparatus that are flexible and that facilitate different coding and/or modulation techniques to convey the data rate option of a downlink traffic channel segment would be beneficial.

SUMMARY OF THE INVENTION

The present invention relates to methods and apparatus for indicating data rate option information. Various methods and apparatus are directed to methods and apparatus for indicating and using downlink data rate option information in a wireless communications system.

Some embodiments and features of the invention are directed to base station methods and apparatus. The features and embodiments of the invention include the subject matter of the pending claims. Other features, embodiments and benefits of the invention are also discussed in the present application.

One particular exemplary embodiment is directed to a method of operating a base station which includes transmitting in a first portion of a first communications segment encoded data rate option information; and transmitting in a second portion of said first communications segment encoded user data. In some but not necessarily all embodiments the step of transmitting the encoded data rate option information includes modulating said encoded data rate option information using a first modulation method which is different from a modulation method used to modulate said encoded user data. The method may further include selecting a data rate option, prior to transmitting said first and second portions of said first communications segment, said data rate option corresponding to one of a plurality of different data rate option groupings, each of said different data rate option groupings corresponding to a different data rate option indicator encoding method, a first grouping in said plurality of groupings corresponding to a first data rate option indicator encoding method wherein the selected data rate option is indicated in an assignment signal separate from the communications segment, a second grouping in said plurality of groupings corresponding to a second data rate option indicator encoding method in which data rate option information is included in the communications segment, said data rate option selected for said first communications segment being in said second grouping.

In some but not necessarily all embodiments, the first data rate option indicator method uniquely identifies the data rate option selected to be used to encode the user data in a communications segment. In some such embodiments when the first data rate option indicator uniquely identifies the data rate option selected to be used to encode the user data, the communications segment for which the option was selected intentionally does not include encoded data rate option information. At least in some embodiments this is done because the data rate option information provided outside the first segment is sufficient to allow decoding and recovery of the user data. The base station may determine the encoding method to be used for said encoded data rate option information based on the data rate option to be communicated, e.g., with one method being used for some data rates and another method being used for different data rate options.

Additional steps and/or features may be included in various embodiments of the invention. Apparatus for implementing the methods of the invention are also described below and are within scope of the invention.

Various exemplary embodiments and features which are used in some but not necessarily all systems implemented in accordance with the invention will now be discussed briefly.

Some embodiments indicate downlink data rate option information through the use of an assignment signal and/or the combination of an assignment signal and information included in the communication segment which is assigned. Methods of indicating rate option information discussed below within a downlink segment, while generally discussed in the context of examples which use downlink assignment signals, can be used alone, e.g., without the use of assignment signals or information in assignment signals. Alternatively, as in the case of most examples, the methods of including rate option information in a downlink segment can be used in combination with the features of the invention which relate to downlink assignment signals.

In some but not necessarily all embodiments of the present invention, base stations support a large number of different downlink data rate options, e.g., 10 or more, available for use in a downlink traffic channel segment. The lower rate options correspond to lower data rates than the higher data rate options. At least some of the different data rate options use different coding rates and/or different modulation schemes for coding/modulating user data included in a downlink segment to which the rate option has been applied. In some embodiments, the lower data rate options, e.g., data rate options 0, 1, and 2, use QPSK modulation, while higher data rate options, e.g., data rate options 3-10, use QAM16, QAM64, or QAM256 modulation.

In various embodiments, downlink traffic channel segments are assigned by a base station though the use of assignment signals. Depending on the embodiment, each assignment signal may correspond to one or multiple segments being assigned. Thus, for each assignment signal there is at least one corresponding downlink channel segment. In some embodiments, the base station can decide, e.g., when making a downlink segment assignment, the data rate option to be used when encoding, modulating and/or mapping user data into the segment being assigned. A variety of different methods of indicating to the wireless terminals or group of wireless terminals the data rate option being used can be supported in accordance with the invention. In some embodiments, the method of indicating the utilized data rate option is determined based on the selected data rate option to be used.

In accordance with one feature supported in some embodiments of the present invention, the assignment signal dedicates less bits to represent rate option information than the number of bits that would be required to uniquely identify each of the possible downlink data rate options that are supported by the base station for downlink traffic channel segments. In some such embodiments, for at least some low data rate options, assignment signal rate option information bits encoded into the segment assignment signal uniquely identify the data rate option of the downlink traffic channel segment to which the assignment signal corresponds. For other data rate options, e.g., higher data rate options, the assignment signal rate option information bits included in the assignment signal indicate that that the data rate option of the downlink traffic channel segment will be included in a special information block, e.g., a predetermined set of transmission units included in the downlink segment being assigned. The special information block normally does not include user data but may include, e.g., various control information in addition to the data rate option information. The transmission units in said special information block may be a contiguous set of transmission units, such as tone-symbols, located at the start of the downlink segment or may be distributed in a non-contiguous but known manner within the downlink segment.

In some particular embodiments, the special information block of a downlink traffic channel segment including a special information block, can have multiple formats and each format corresponds to a group of codes. For example, a first format may map 5 information bits including 1 rate option indicator bit to 32 coded bits, where the pattern of each of 16 bit pairs of coded bits may be 00 or 11; a second format may map 8 information bits including 3 rate option indicator bits to 32 coded bits, where the pattern of each of 16 bit pairs of coded bits may be 01 or 10. In some such embodiments, the coded bits of the special information block are mapped to QPSK modulation symbols.

In some embodiments, three groupings of levels of downlink traffic channel user data/information data rate options exist: (i) a first lowest grouping where the special information block is not implemented in the downlink traffic channel segment and where the data rate option is uniquely indicated in the assignment signal, (ii) a second intermediate level grouping where the special information block is used, where a first number of information bits are coded into the special information block, and where the special information block includes one information bit dedicated to uniquely identifying two data rate options, (iii) a third higher level grouping where the special information block is used, where a second number of information bits are coded into the special information block, said second number being larger than said first number, and where the special information block includes three information bits dedicated to uniquely identifying at least six data rate options. In some such embodiments, for the first grouping the downlink traffic channel segment uses QPSK modulation; for the second grouping the downlink traffic channel segment uses QPSK for the special information block portion and QAM16 for the user data coded block portion; for the third grouping the downlink traffic channel segment uses QPSK modulation for the special information block portion and one of QAM16, QAM64, and QAM256 for the user data coded block portion.

In accordance with a feature of various embodiments of the present invention, the base station does not specifically identify the format type of the special information block, but rather the grouping of codes allows a wireless terminal receiving the special information block to distinguish and identify the format type of received special information block. In some implementations, the wireless terminal, after having determined the format type of the special information block, will attempt to recover the information bit or bits of special information block which identify the data rate option used for the downlink traffic channel segment. Using a recovered data rate option value, the wireless terminal can properly interpret the received modulation symbol values corresponding to the coded user data, and attempt to recover the user data information bits which were encoded by the base station prior to transmission.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

BRIEF DESCRIPTION OF THE FIGURES

FIG. 4 is a table illustrating exemplary downlink traffic channel rate option information in accordance with the present invention.

FIG. 5 is a table including exemplary downlink traffic channel assignment signaling information, in accordance with the present invention.

FIG. 9 is a table describing downlink traffic channel segment rate option information and corresponding special information block information, in accordance with the present invention.

FIG. 10 is a table describing an exemplary special information block in a downlink traffic channel segment using an exemplary first format, in accordance with the present invention.

FIG. 11 is a table describing an exemplary special information block in a downlink traffic channel segment using an exemplary second format, in accordance with the present invention.

FIG. 18 is a flowchart of an exemplary method of operating a wireless terminal, in accordance with the present invention.

DETAILED DESCRIPTION OF THE INVENTION

Figure 1:
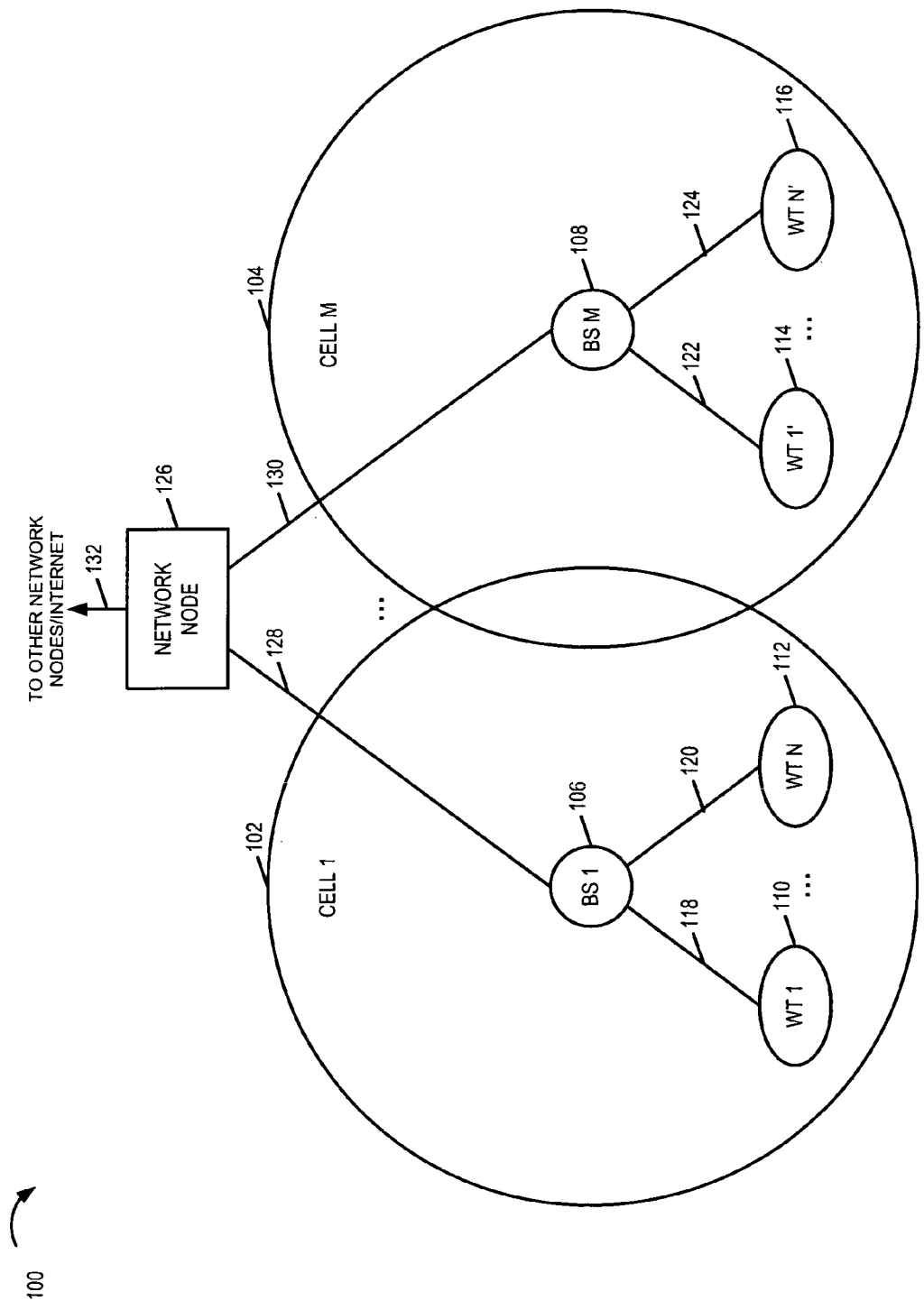
FIG. 1 is a drawing of an exemplary communications system, implemented in accordance with the present invention and using methods of the present invention.

FIG. 1 is a drawing of an exemplary communications system 100, implemented in accordance with the present invention and using methods of the present invention. System 100 includes apparatus and methods directed to improving downlink communications by supporting a plurality of different downlink data rate option options and communicating a selected downlink data rate for a given downlink traffic channel segment in an efficient manner in accordance with the present invention. Exemplary system 100 may be, e.g., an orthogonal frequency division multiplexing (OFDM) multiple access wireless communication system. System 100 includes a plurality of cells (cell 1 102, cell M 104). Each cell (cell 1 102, cell M 104) represents a wireless coverage area for a corresponding base station (BS 1 106, BS M 108), respectively. A plurality of wireless terminal (WTs) (WT 1 110, WT N 112, WT 1' 114, WT N' 116) are included in system 100. At least some of the WTs are mobile nodes (MNs); the MNs may move throughout the system 100 and establish wireless links with different BSs, the BS corresponding to the cell in which the WT is currently located. In FIG. 1, (WT 1 110, WT N 112) are coupled to BS 1 106 via wireless links (118, 120), respectively; (WT 1' 114, WT N' 116) are coupled to BS M 108 via wireless links (122, 124), respectively.

The BSs (106, 108) are coupled to network node 126 via network links (128, 130), respectively. Network node 126 is coupled to other network nodes, e.g., routers, other base stations, AAA server nodes, Home Agent nodes, etc. and/or the Internet via network link 132. Network links 128, 130, 132 may be, e.g., fiber optic links. Network node 126 and networks links 128, 130, 132 are part of a backhaul network linking various BSs in different cells together and providing connectivity so that a WT located in one cell can communicate with a peer node in a different cell.

System 100 is shown having cells with one sector per cell. The methods and apparatus of the present invention are also applicable in systems having more than one sector per cell, e.g., 2, 3, or more than 3 sectors per cell and in systems having different numbers of sectors per cell in different portions of the system. In addition, the methods and apparatus of the present invention are also applicable to many non-cellular wireless communications systems including at least one base station and one wireless terminal.

Figure 2:
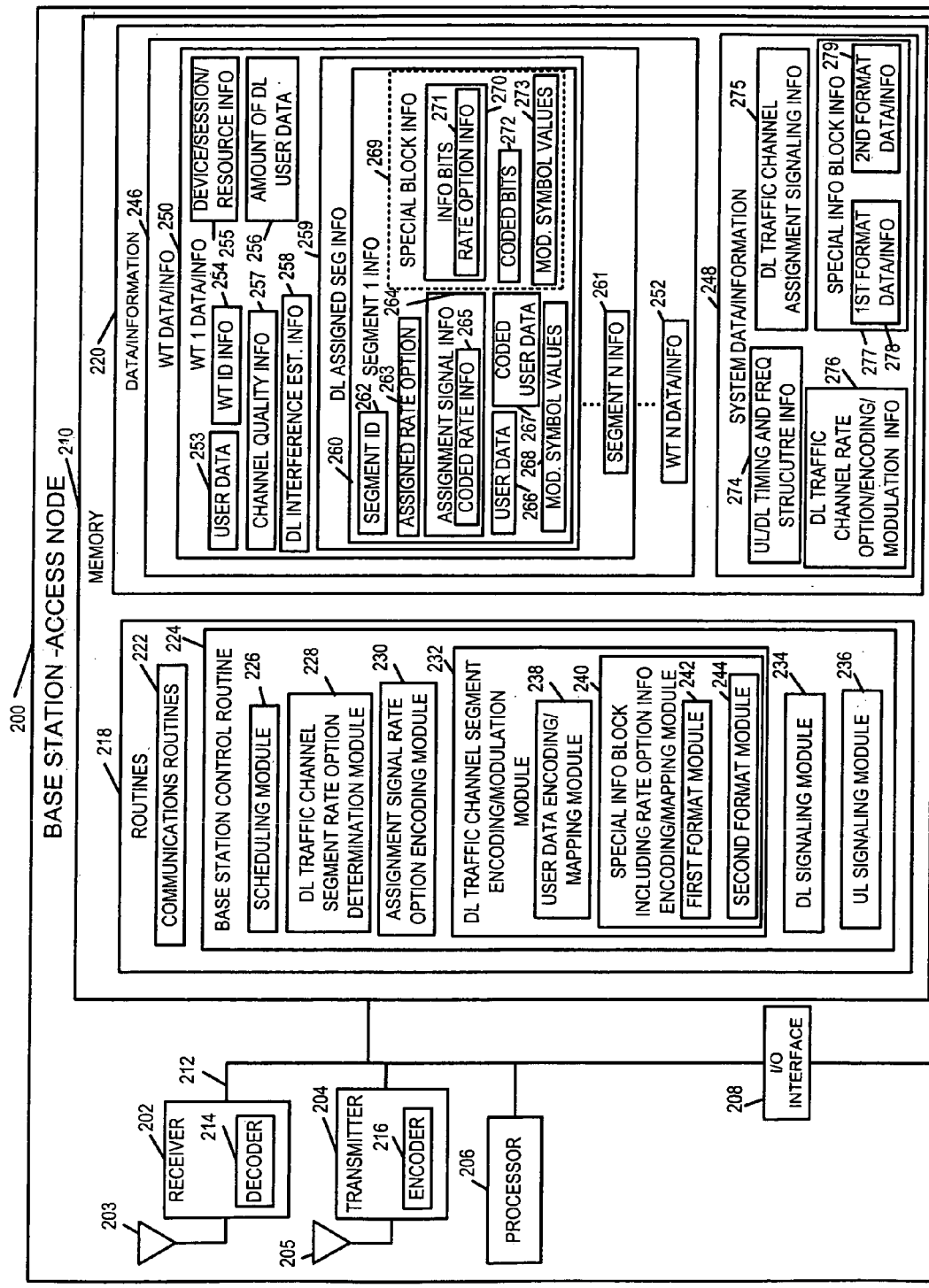
FIG. 2 is a drawing of an exemplary base station, implemented in accordance with the present invention and using methods of the present invention.

FIG. 2 is a drawing of an exemplary base station 200, implemented in accordance with the present invention and using methods of the present invention. Exemplary BS 200 is sometimes referred to as an access node. BS 200 may be any of the BS (106, 108) of system 100 of FIG. 1. Exemplary BS 200 includes a receiver 202, a transmitter 204, a processor 206, I/O interface 208, and memory 210 coupled together via a bus 212 over which the various elements may interchange data and information.

Receiver 202 is coupled to receive antenna 203 through which BS 200 may receive uplink signals from a plurality of wireless terminals. Receiver 202 includes a decoder 214 for decoding received encoded uplink signals.

Transmitter 204 is coupled to transmit antenna 205 over which downlink signals are sent to a plurality of wireless terminals. Transmitter 204 includes an encoder 216 for encoding information prior to transmission. Downlink signals include assignments signals including assignments of downlink traffic channel segments. Said assignment signals include rate option information. Downlink signals also include downlink traffic channel segment signals. Some of the downlink traffic channel segments include a special information block including rate option information corresponding to the data rate used for user data in the downlink traffic channel segment.

I/O interface 208 couples the BS 200 to other network nodes, e.g., routers, other base stations, AAA server nodes, Home Agent nodes and/or the Internet. I/O interface 208 provides an interface to a backhaul network providing interconnectivity between nodes in different cells.

Memory 210 includes routines 218 and data/information 220. The processor 206, e.g., a CPU, executes the routines 218 and uses the data/information 220 in memory 210 to operate the BS 200 and implement methods of the present invention.

Routines 218 include communications routines 222 and base station control routines 224. The communications routines 222 implement various communications protocols used by BS 200.

The base station control routines 224 control the operation of BS 200 including receiver 202 operation, transmitter 204 operation, I/O interface 208 operation, and the implementation of methods of the present invention. Base station control routines 224 include a scheduling module 226, a downlink traffic channel segment rate option determination module 228, an assignment signal rate option encoding module 230, a downlink traffic channel segment encoding/modulation module 232, a downlink signaling module 238, and an uplink signaling module 240. The downlink traffic channel segment encoding/modulation module 232 includes a user data encoding/mapping module 238 and a special information block, including rate option info, encoding/mapping module 240. Special information block module 240 includes a first format module 242 and a second format module 244.

The scheduling module 226, e.g., a scheduler, schedules uplink and downlink channel air link resources, e.g., segments, to wireless terminal users. Scheduler 226 operations include assigning downlink traffic channel segments to specific wireless terminals from a plurality of wireless terminal, in accordance with a scheduling policy. Different downlink traffic channel segments may have different characteristics, e.g., more tones for a shorter duration or fewer tones for a longer duration, and the scheduler may take these differences into consideration when deciding which downlink traffic channel segment should be assigned to which user. Scheduler 226 may assign a number of downlink traffic channel segments to a wireless terminal at a point in time based upon an estimate of the amount of data to be transmitted to the WT, priority levels, subscriber tier levels, latency consideration, estimates of channel conditions, e.g., using channel condition feedback reports, and/or estimates of interference levels, e.g., using feedback information from the WTs such as beacon ratio report information. Each tone may be used to communicate a signal during an OFDM symbol transmission time period.

Downlink traffic channel segment rate option determination module 228 determines the rate option, e.g., in coordination with the scheduling operations, to be used for a downlink traffic channel segment from among a plurality of data rate options supported by the base stations for the downlink, where each data rate option corresponds to a coding rate and modulation scheme. For example, an exemplary system may support 11 different data rate options in the downlink, each one corresponding to a different number of MAC frames, a different number of information bits to be encoded in the downlink traffic channel segment, and a particular modulation constellation; different modulation constellations, e.g., QPSK, QAM16, QAM64, QAM256, are used to convey the coded bits of the user data for at least some different rate options. For example, the lowest three data rate options may use QPSK, the next four highest QAM16, the next two highest QAM64, and the next two highest QAM256. In addition to determining the data rate option for the downlink traffic channel segment, module 228 controls flow of control to other modules based on the determined rate. For example, in some embodiments, for low data rate options, e.g., rate options 0, 1, and 2 using QPSK, the special information block module is not called, since the special information block is not implemented.

Assignment signal rate option encoding module 230 encodes downlink traffic channel rate option information into assignment signals corresponding to downlink traffic channel segments. For some rate options, e.g., rate options 0, 1, or 2 using QPSK, the actual rate option is encoded into the assignment signal, while for some other rate options, e.g., rate option 3-10, information, e.g., a bit pattern such as 11, is encoded into the assignment signal in the field designated for rate information, which indicates that the actual assigned rate option will be conveyed in a special information block which is part of the downlink traffic channel segment and that the rate option will be within a specified range, e.g., rate option 3-10.

Downlink traffic channel segment encoding/modulation module 232 performs encoding and modulation operation for the downlink traffic channel segments. User data encoding and mapping module 238 encodes the user data information bits into coded bits in accordance with the coding rate and code corresponding to the determined downlink traffic channel data rate option for the segment. User data and mapping module 238 also maps the coded bits to modulation symbol values in accordance with the modulation constellation corresponding to the determined data rate option for the downlink traffic channel segment. User data encoding/mapping module 238 also associates the modulation symbol values with tone-symbols of the segment. In some embodiments, for low data rate options, e.g., data rate options 0, 1, 2, using QPSK, each of the tone-symbols of the segment, e.g., are allocated for modulation symbols values corresponding to the coded user data, while for higher data rate options, most of the tone-symbols of the segment, e.g., 656 out of 672, are allocated for modulation symbol values corresponding to the coded user data and a small number of the tone-symbols, e.g., 16 out of 672, are allocated to modulation symbols corresponding to a special information block.

Special information block, including rate option information, encoding/mapping module 240 performs encoding, mapping and modulation operations pertaining to the special information block of the downlink traffic channel segments. Special block module 240 supports two different operational formats and includes a first format module 242 and a second format module. The first format module 242 performs encoding mapping, and modulation operations pertaining to a first group of data rate options, e.g., rate options 3-4, while the second format module 244 performs encoding, mapping, and modulation operations pertaining to a second group of data rate options, e.g., data rate options 5-10, the data rates of the second group being higher than the data rates of the first group. For example, first format module 242 may encode a set of 5 information bits including one data rate bit into a set of 32 information bits; Reed-Muller based codes may be used, and the resulting set of coded bits may be 16 two bits pairs with each bit pair having the value 00 or 11. The value of the one data rate bit may be used to specify whether rate option 3 or 4 is used for the user data portion of the downlink traffic channel segment. Continuing with the example, second format module 244 may encode a set of 8 information bits including three data rate bit into a set of 32 information bits; Reed-Muller based codes may also be used, and the resulting set of coded bits may be 16 two bits pairs with each bit pair having the value 01 or 10. The value of the three data rate bits may be used to specify whether rate option 5, 6, 7, 8, 9, or 10 is used for the user data portion of the downlink traffic channel segment, e.g., with two possibilities being reserved, e.g., for future enhancements and/or the addition of additional rates. Module 242 or 244, maps the generated coded bits to modulation symbol values for a QPSK modulation constellation, e.g., the set of 32 coded bits to 16 modulation symbol values for the segment. Module 242 or 244 also associates the modulation symbol values with tone-symbol of the special information block of the downlink traffic channel segment.

In accordance with one feature of the some embodiments of the present invention, the coding rate of the first format module 242, e.g., 3 information bits-32 coded bits, is lower than the coding rate of the second format module 244, e.g., 5 info bits-32 coded bits, and the data rate of the user information associated with use of first format module 242, e.g., data rate options 3 or 4 corresponding to 848-1056 info bits, is lower than the data rate of the user information associated with use of second format module 244, e.g., data rate options 5-10 corresponding to 1264-3760 information bits. In accordance with another feature of some embodiments of the present invention, the first format module 242 produces a set of modulation symbol values which are distinct from the set of modulation symbol values produced by the second format module. For example, first format module 242, when executed, may generate a set of 16 QPSK modulation symbol values using a first two of the four possible QPSK modulation symbol values in the set of four, the first two values representing two diagonally opposed quadrants in the complex plane. Similarly, the second format module 244, when executed, may generate a set of 16 QPSK modulation symbol values using a second two, the remaining two, of the four possible QPSK modulation symbol values for the QPSK constellation.

Downlink signaling module 238 controls operation of the transmitter 204 and its encoder 204 to transmit downlink signals including beacon signals, pilot signal, downlink traffic segment assignment information signals including data rate option information and downlink traffic channel segment signals, at least some of the downlink traffic channel segments including a special information block including the rate option used for the user information of the downlink traffic channel segment.

Uplink signaling module 240 controls operations of receiver 202 and its decoder 214 to receive and process uplink signals including: resource requests, channel quality reports, interference reports, and uplink traffic channel signals from a plurality of WTs.

Data/information 220 includes a plurality of sets of WT data/information 246 (WT 1 data/info 250, WT N data info 252) and system data/information 248. WT 1 data/information 250 includes user data 253, WT identification information 254, device/session/resource information 255, amount of downlink user data 256, channel quality information 257, downlink interference estimate information 258, and downlink assigned segment information 259.

User data 250 includes user data/information such as e.g., data/info representing voice, text or video, received on uplink traffic channel segments from WT 1 intended to be forwarded to a peer node of WT 1 in a communications session with WT 1. User data 250 may also include user data/information sourced from a peer node of WT 1 to be communicated to WT 1 via downlink traffic channel segment signals.

WT identification information 254 includes, e.g., a base station assigned active user identifier and an IP address associated with WT 1. Device/session/resource information 254 includes uplink and downlink segments, e.g., traffic channel segments, assigned to WT 1 by scheduling module 226 and session information including address and routing information pertaining to peer nodes of WT1 in communication sessions with WT 1.

Channel quality information 257 includes information obtained or derived from a received channel quality report from WT 1 and channel quality information determined from measurements and evaluation of uplink signals from WT1. Downlink interference estimation information 258 includes base station estimates of the potential interference levels is expected to be generated by transmitting to WT1, e.g., on a downlink traffic channel segment, in accordance with expected transmission power levels corresponding to different potential rate options and/or a determined rate option.

Amount of downlink user data 256 is a BS 200 measure, using information currently available to BS 200, of the current downlink data transmission needs of WT1. Amount of downlink user data 256 may be used by scheduling module 226 in determining the number of downlink traffic channel segments to assign to WT1.

Downlink assigned segment information 259 may include one or more sets of segment information (segment 1 information 260, segment N information 261), e.g., depending upon current assignments to WT1. Segment 1 information 260, includes a segment identifier 262, an assigned rate option 263, assignment signal information 264, user data 266, coded user data 267, modulation symbol values 268, and, for some segments depending upon the assigned rate option 263, special block information 269.

Segment identifier 262, e.g., a segment index number, identifies the downlink traffic channel segment from among a plurality of downlink traffic channel segments in the downlink timing structure. Assigned rate option is the determined data rate option determined by module 228 for the downlink traffic channel segment. Assignment signal information 264 includes coded rate information 265. Coded rate information 265 includes information, e.g., two bits, specifying the actual assigned rate 2633 or identifying that a special information block will be used in the downlink traffic channel segment, said special information block including information identifying the assigned rate option 263. User data 266 includes the user information bits which are encoded into coded user data 267, for the downlink traffic channel segment corresponding to the coding rate and code corresponding to the assigned rate option 263. Modulation symbol values 268 includes the modulation symbol values generated from mapping the coded user data bits 267 onto the modulation constellation being used for the downlink traffic channel segment, corresponding to the assigned rate option, e.g., the modulation constellation being one of QPSK, QAM 16, QAM64, QAM256. The number of modulation symbol values 268, for the downlink traffic channel segment may vary depending upon whether or not a special information block is included.

Special information block information 269 includes information bits 270 including rate option information 270, coded bits 272, and modulation symbol values 273. For example, the special information block info 269 may be used if the segment corresponds to any of a higher set of rate options, e.g., data rate option 3-10 using QAM16, QAM64 or QAM256 modulation constellations for coded user data, while block 269 may be omitted for lower rate options, e.g., data rate options 0-2 using a QPSK modulation constellation for coded user data. The information bits 270 represent the input to the special information block, e.g., 5 information bits when a first format is used or 8 information bits when a second format is used. Information bits 270 include rate option information bits 271, e.g., 1 bit specifying between two possible rate options such as rate option 3 or 4 in a first format or 3 bits specifying between six possible rate options such as rate options 5, 6, 7, 8, 9, 10, with reserve for two additional rate options to be specified in a second format. The rate specified in rate option info 271, corresponds to the assigned rate option 263. Coded bits 272 is a set of coded bits, e.g., 32 coded bits, corresponding to the info bits 270 using the code and coding rate in accordance with the assigned rate option. Two different coding methods are used to determine the coded bits 272 in accordance with either a first or second format type, each format type corresponding to a group of codes. Modulation symbol values 273 represent QPSK symbol values generated by the mapping of the coded bits 272, e.g., 16 QPSK symbol values. In accordance with one feature of various embodiments of the present invention, for a given downlink traffic channel segment, the modulation symbol values 273 take on two values from the set of four possible values, the two values representing diagonally opposed quadrants or opposed positions in the complex plane.

System data/information 248 includes uplink/downlink timing and frequency structure information 274, downlink traffic channel assignment signaling information 275, downlink traffic channel rate option/encoding/modulation information 276, and special block information 277.

Uplink/downlink timing and frequency structure information 274 includes, e.g., symbol timing information, tone spacing information, number of uplink tones, number of downlink tones, uplink carrier frequency, downlink carrier frequency, uplink bandwidth, downlink bandwidth, uplink set of tones, downlink set of tones, uplink tone hopping information, uplink dwell information, downlink tone hopping information, downlink traffic segment structure information, uplink traffic segment structure information, repetitive timing structures, e.g., symbol time intervals and grouping of symbol time intervals into, e.g., dwells, half-slots, slots, superslots, beacon slots, ultra slots, etc., relationships between assignment signals and downlink traffic channel segments. Downlink traffic channel segment structure information includes information identifying groupings of air link resources, e.g., tone-symbols, into segments, and information identifying further groupings of the air link resources of a segment into sub-segments, e.g., information identifying which tone-symbols of a downlink traffic channel segment are used for a special information block and which tone-symbols of the same downlink traffic channel segment are used for a coded user data block, when the downlink traffic channel segment corresponds to one of the data rate options employing the special information block.

Downlink traffic channel assignment signaling information 275 includes information identifying fields and the significance of different possible values within the fields within assignments signals, e.g., information pertaining to a downlink traffic channel segment rate option sub-field in an assignment signal. For example, a 2 bit rate option sub-field in an assignment signal, corresponding to a downlink traffic channel segment, may convey three possible low level rate options, e.g., rate options 0, 1, 2 as indicated by bit pattern (00, 01, or 10) or may convey that one of a higher level rate options is used and that the actual assigned rate will be conveyed in a special information block as part of the downlink traffic channel segment, e.g., bit pattern (11) may convey that one of rate options (3-10) is used and that the actual rate is included in a special information block of the downlink traffic channel segment.

Downlink traffic channel rate option/encoding/modulation information 276 includes information identifying the various downlink traffic channel data rate options supported by the base station, the number of MAC frames corresponding to each data rate option, the number of information bits corresponding to each data rate option, the codeword length and code used corresponding to each data rate option, and the modulation constellation used corresponding to each data rate option.

Special information block information 277 includes $1^{st}$ format data/information 278 and $2^{nd}$ format data/information 279. First format data/information 278 includes information identifying which downlink traffic channel data rate options are associated with the first format for the special information block, the information bit fields of a $1^{st}$ format special information block, the bit size of each field, the interpretation given to the bit values in each field, the coding method uses, e.g., including code generation matrix, coding bit mapping information to modulation symbols, the modulation scheme used, etc. For example, the first format, may be associated with two downlink traffic channel rate options 3 and 4; a first format special information block may convey 5 information bit including a single bit rate option indicator which indicates either rate option 3 or 4, and a 4 bit transmission power indicator value, the coding may be based upon Reed-Muller codes and may result in 32 coded bits mapped to 16 QPSK modulation symbol values.

Second format data/information 279 includes information identifying which downlink traffic channel data rate options are associated with the second format for the special information block, the information bit fields of a $2^{nd}$ format special information block, the bit size of each field, the interpretation given to the bit values in each field, the coding method uses, e.g., including code generation matrix, coding bit mapping information to modulation symbols, the modulation scheme used, etc. For example, the second format, may be associated with six downlink traffic channel rate options 5-10 with 2 reserved designations; a second format special information block may convey 8 information bits including a three bit rate option indicator which indicates which rate option from the range of rate options 5-10 has been assigned, and a 5 bit transmission power indicator value, the coding may be based upon Reed-Muller codes and may result in 32 coded bits mapped to 16 QPSK modulation symbol values. First and second format data/information 278, 279 may each be associated with a different group of codes, e.g., such that possible QPSK modulation symbols values corresponding to a $1^{st}$ format special information block are different, e.g., different quadrants in the complex plane, than modulation symbol values corresponding to a $2^{nd}$ format special information block.

Figure 3:
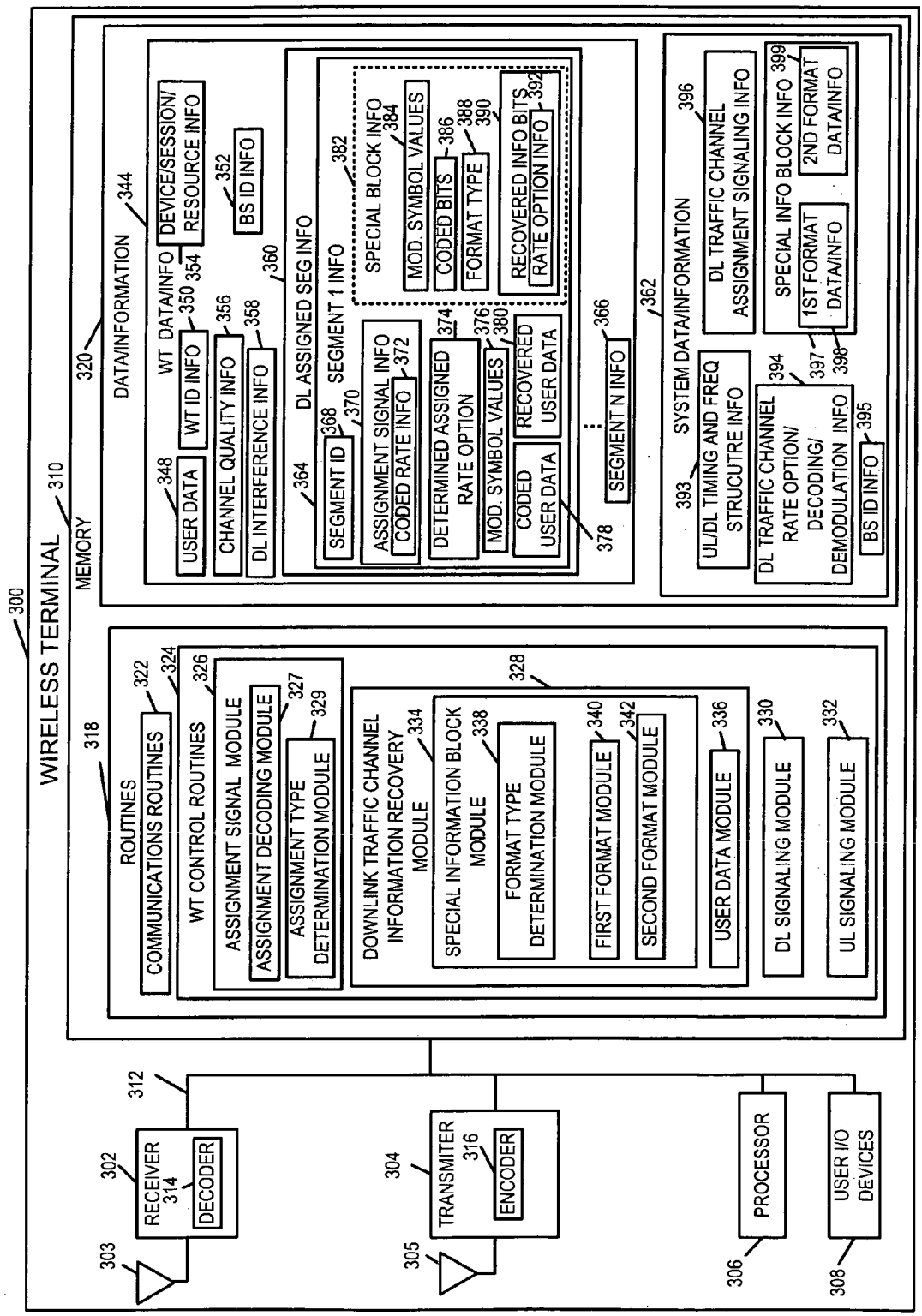
FIG. 3 is a drawing of an exemplary wireless terminal, implemented in accordance with the present invention and using methods of the present invention.

FIG. 3 is a drawing of an exemplary wireless terminal 300, implemented in accordance with the present invention and using methods of the present invention. WT 300 may be any of the WTs (110, 112, 114, 116) of system 100 of FIG. 1. Exemplary WT 300 includes a receiver 302, a transmitter 304, a processor 306, user I/O devices 308, and memory 310 coupled together via a bus 312 over which the various elements may interchange data and information.

Receiver 302 is coupled to receive antenna 303 through which WT 300 receives downlink signals from BS 200 including assignments for downlink traffic channel segments and downlink traffic channel segment signals. Receiver 302 includes a decoder 314 which is used by WT 300 to decode received downlink signals from BS 200.

Transmitter 304 is coupled to transmit antenna 305 through which WT 300 transmits uplink signals to BS 200 including channel quality reports, interference reports, uplink resource request messages, and uplink traffic channel segment signals. In some embodiments, the same antenna is used as both the transmit antenna 305 and the receive antenna 303. Transmitter 204 includes an encoder 316 for encoding uplink data/information prior to transmission.

User I/O devices 308 includes, e.g., microphones, speakers, keypad, keyboard, mouse, touch-screen, camera, displays, alarms, vibration device, etc. Various user I/O devices 308 are used to input user data/information intended for peer nodes of WT 300 and to output received data/information from peer nodes of WT 300. In addition, user I/O devices 308 are used by an operator of WT 300 to initiate various functions, e.g., power on, power off, place a call, terminate a call, etc.

Memory 310 includes routines 318 and data/information 320. The processor 306, e.g., a CPU, executes the routines 318 and uses the data/information 320 in memory 310 to control the operation of WT 300 and implement the methods of the present invention.

Routines 318 include a communications routine 322 and wireless terminal control routines 324. The communications routine 322 implements the various communications protocols used by the WT 300. The wireless terminal control routines 324 control operations of WT 300 including the operation of receiver 302, transmitter 304, and user I/O devices 308. Wireless terminal control routines 324 include assignment signal module 326, downlink traffic channel information recovery module 328, a downlink signaling module 330, and an uplink signaling module 332.

Assignment signal module 326 processes received assignment signals, identifying segment identification information of assigned downlink traffic channel segments assigned to WT300 and recovering rate information included in the assignment signals, e.g., recovering a specific assigned data rate for the assigned downlink traffic channel segment or recovering information indicating that the specific rate for the downlink traffic channel segment will be included in a special information block of the downlink traffic channel segment. Assignment signal module 326 includes an assignment decoding module 327 and an assignment type determination module 329. Assignment decoding module 325 decodes received assignment signals. Assignment type determination module 329 determines if an assignment is of a first type which indicates a data rate option corresponding to a downlink channel segment being assigned by an assignment signal or is of a second type of assignment signal which includes an indicator indicating that the segment being assigned by the assignment signal includes information indicating the data rate option used for user data included in the segment being assigned by the assignment signal. Downlink traffic channel information recovery module 334 includes a special information block module 334 and a user data module. Special information block module 334 performs operations to control the recovery of information included in special information blocks of downlink traffic channel segments assigned to WT 300. Special information block module 338 includes a format type determination module 338, a first format module 340, and a second format module 342. Format type determination module 338 determines which format type has been used to encode the information bits of the special information block of a received downlink traffic channel segment. First format module 340 is operated to recover the information bits conveyed by the coded information bits of the special information block, when determined that the special information block uses the first format type. Second format module 340 is operated to recover the information bits conveyed by the coded information bits of the special information block, when determined that the special information block uses the second format type. For example, first format type module 340 may be used, when called, to recover from 16 QPSK modulation symbol values, 5 information bits including 1 rate option bit indicating a specific rate option among two rate options, e.g., whether the downlink traffic channel data rate option for the downlink traffic channel was rate option 3 or rate option 4; while the second format module 342 may be used, when called, to recover from 16 QPSK modulation symbol values, 8 information bits including three rate option bits indicating which specific downlink traffic channel rate option from among 8 or less rate options, e.g., whether the downlink traffic channel rate option for the downlink traffic channel segment is rate option 5, 6, 7, 8, 9, or 10.

User data module 336 is operated to recover user data information bits from the downlink traffic channel segment. The determined data rate option can be used to influence operations of the user data information recover operations, e.g., controlling decoder 314 operations. For example, some data rate options, e.g., data rate options 0, 1, 2 using QPSK, may not use a special information block, while other data rate options, e.g., data rate options 3-10 using QAM16, QAM64 or QAM256 may employ a special information block. In some such embodiments, when the special information block is not employed, the user data module 336 will the data rate option value recovered from the assignment signal and each of the modulation symbols values from the downlink traffic channel segment in the user data information bit recovery operation. In some such embodiments, when the special information block is employed, the user data module 336 will use the data rate option indicated by the output of the special information block module and modulation symbols values associated with non-special block tone-symbols from the downlink traffic channel segment in the user data information bit recovery operation.

Downlink signaling module 330 controls operation of the receiver 302 and decoder 314 to receive and process downlink signals from a BS 200, said downlink signals including downlink traffic channel segment assignment messages and downlink traffic channel signals. In some embodiments, DL signaling module 330 works in conjunction with assignment signaling module 326 and/or downlink traffic channel information recovery module 328.

Uplink signaling module 338 controls the operation of transmitter 304 and encoder 316 to encode and transmit uplink signals to BS 200, said uplink signals including channel quality reports, interference reports, uplink resource request messages and uplink traffic channel segment messages.

Data/information 320 includes WT data/info 344, and system data/information 362. WT data/information 344 includes user data 348, WT identification (ID) information 350, base station ID information 352, device/session/resource information 354, channel quality information 350, downlink interference information 358, and downlink assigned segment information 360. User data 348 includes data/information intended for a peer of WT 300 in a communications session with WT 300 intended to be transmitted by WT 300 to BS 200 over uplink traffic channel segments. User data 348 also includes data/information sourced from a peer of WT 300 in a communications session with WT 300 and received from BS 200 via downlink traffic segments.

Wireless terminal identification information 350 includes, e.g., a WT IP address and a BS 200 assigned WT active user identifier. Base station identifier information 352 includes an identifier, e.g., a value distinguishing the specific BS 200 point of network attachment to which WT 300 is using as its current point of network attachment, from among a plurality of different BS point of network attachment in the wireless communications system. In some embodiments BS ID information 346 includes information identifying a specific sector and/or carrier frequency being used by the BS point of network attachment. Device/session/resource information 354 includes uplink and downlink segments, e.g., traffic channel segments, assigned to WT 300 and session information including address and routing information pertaining to peer nodes of WT 300 in communication sessions with WT 300. Channel quality information 350 includes information measured, derived and estimated pertaining to the wireless communications channel between WT 300 and BS 200, e.g., a channel quality report based on received downlink pilot signals. Downlink interference information 358 includes information identifying levels of interference WT 300, e.g., a beacon ratio report.

Downlink assigned segment information 360 includes information identifying the downlink traffic channel segments assigned by BS 200 to WT 300, e.g., in received downlink segment assignment messages. Downlink assigned segment information 360 includes one or more sets of information (segment 1 information 364, segment N information 366), each set corresponding to a downlink traffic channel segment assigned to WT 300. Segment 1 information 364 includes a segment identifier 368, assignment signal information 370 including coded rate information 372, determined assigned rate option 374, modulation symbol values 376, coded user data 378, recovered user data 380, and, for some segments, special block information 382. Segment identifier 368 identifies the downlink traffic channel segment from among a plurality of downlink traffic channel segments in the downlink timing and frequency structure. Assignment signal information includes information from a received assignment signal identifying WT300 as the recipient of the downlink traffic channel segment identified with segment ID 368. Coded rate information 372 includes bits in the assignment signal designated to convey rate option information, e.g., either the actual data rate option used in the downlink traffic channel segment for user data or an indication that the actual data rate option used in the traffic channel segment for user data will be conveyed in a special information block of the downlink traffic channel segment. The determined assigned rate option 374 is the data rate option assigned by the BS200 and used for the downlink traffic channel segment user data signals, determined via the assignment signal module 326, e.g., for low rate options such as 0, 1, 2, or determined by special information block module 334, e.g., for higher rate options such as rate options 3-10. Modulation symbols values 376 include the recovered modulation symbol values conveying coded user data. In some embodiments, the number of number of recovered modulation symbols values conveying coded user data for the downlink traffic channel segment varies, e.g., between two levels depending upon whether or not a special information block is included in the downlink traffic channel segment. Coded user data 378 includes bit values of coded bits mapped from the modulation symbol values 376, while recovered user data 380 includes recovered information bits representing user data decoded from the coded user data bits 378.

Special block information 382, includes modulation symbol values 384, coded bits 386, format type 388, and recovered information bits 390. Modulation symbol values 384 includes the recovered modulation symbol values of the tone-symbols of the special information block of the downlink traffic channel segment, e.g., 16 QPSK modulation symbol values. Coded bits 386 includes the coded information bits corresponding to the modulation symbol values 384, e.g., 32 coded bits. Format type 388 includes information identifying whether the special information block was formatted using a first or second formatting method. Recovered information bits 390 includes the recovered information bits of the special information block corresponding to the coded bits 386 in accordance with the coding method and formatting used by the format type 388. For example, in some embodiments, if a first format type was used, then 5 information bits are recovered including 1 bit conveying rate option information 392 and four bits conveying other information, e.g., power level information, while if a second format type was used, then 8 information bits are recovered including 3 bits conveying rate option information 392 and 5 bits conveying other information, e.g., power level information.

Uplink/downlink timing and frequency structure information 393 includes, e.g., symbol timing information, tone spacing information, number of uplink tones, number of downlink tones, uplink carrier frequency, downlink carrier frequency, uplink bandwidth, downlink bandwidth, uplink set of tones, downlink set of tones, uplink tone hopping information, uplink dwell information, downlink tone hopping information, downlink traffic segment structure information, uplink traffic segment structure information, repetitive timing structures, e.g., symbol time intervals and grouping of symbol time intervals into, e.g., dwells, half-slots, slots, superslots, beacon slots, ultra slots, etc., relationships between assignment signals and downlink traffic channel segments. Downlink traffic channel segment structure information includes information identifying groupings of air link resources, e.g., tone-symbols, into segments, and information identifying further groupings of the air link resources of a segment into sub-segments, e.g., information identifying which tone-symbols of a downlink traffic channel segment are used for a special information block and which tone-symbols of the same downlink traffic channel segment are used for a coded user data block, when the downlink traffic channel segment corresponds to one of the data rate options employing the special information block. Different sets of UL/DL timing and frequency structure information 393 may exist and be stored in WT 300 corresponding to different BSs 200 in the wireless communications system.

Downlink traffic channel assignment signaling information 396 includes information identifying fields and the significance of different possible values within the fields within assignments signals, e.g., information pertaining to a downlink traffic channel segment rate option sub-field in an assignment signal. For example, a 2 bit rate option sub-field in an assignment signal, corresponding to a downlink traffic channel segment, may convey three possible low level rate options, e.g., rate options 0, 1, 2 as indicated by bit pattern (00, 01, or 10) or may convey that one of a higher level rate options is used and that the actual assigned rate will be conveyed in a special information block as part of the downlink traffic channel segment, e.g., bit pattern (11) may convey that one of rate options (3-10) is used and that the actual rate is included in a special information block of the downlink traffic channel segment.

Downlink traffic channel rate option/decoding/demodulation information 394 includes information identifying the various downlink traffic channel data rate options supported by the base station, the number of MAC frames corresponding to each data rate option, the number of information bits corresponding to each data rate option, the codeword length and code used corresponding to each data rate option, the modulation constellation used corresponding to each data rate option, demodulation methods and decoding methods. Such information 394 is used in the demodulating and decoding operations performed.

Special information block information 397 includes $1^{st}$ format data/information 398 and $2^{nd}$ format data/information 399. First format data/information 398 includes information identifying which downlink traffic channel data rate options are associated with the first format for the special information block, the information bit fields of a $1^{st}$ format special information block, the bit size of each field, the interpretation given to the bit values in each field, the decoding method to use, e.g., including information bit recovery matrix, modulation symbols to coded bit mapping information, the demodulation scheme to use, etc. For example, the first format, may be associated with two downlink traffic channel rate options 3 and 4; a first format special information block may convey 5 information bit including a single bit rate option indicator which indicates either rate option 3 or 4, and a 4 bit transmission power indicator value, the coding may be based upon Reed-Muller codes and may result in 32 coded bits mapped to 16 QPSK modulation symbol values. Second format data/information 279 includes information identifying which downlink traffic channel data rate options are associated with the second format for the special information block, the information bit fields of a 2nd format special information block, the bit size of each field, the interpretation given to the bit values in each field, the decoding method to use, e.g., including information bit recovery matrix, modulation symbol to coded bit mapping information, the demodulation scheme to used, etc. For example, the second format, may be associated with six downlink traffic channel rate options 5-10 with 2 reserved designations; a second format special information block may convey 8 information bits including a three bit rate option indicator which indicates which rate option from the range of rate options 5-10 has been assigned, and a 5 bit transmission power indicator value, the coding may be based upon Reed-Muller codes and may result in 32 coded bits mapped to 16 QPSK modulation symbol values. First and second format data/information 398, 399 may each be associated with a different group of codes, e.g., such that possible QPSK modulation symbols values corresponding to a 1st format special information block are different, e.g., different quadrants in the complex plane, than modulation symbol values corresponding to a 2nd format special information block.

Base station identification information 395 includes information used to distinguish between different base station cells, sectors and/or frequencies used in the communications system. For example, different values of pilot tone signal slopes may be used in different adjacent cells in the system.

FIG. 4 is a drawing of a table 400 of exemplary downlink traffic channel rate option information in accordance with the present invention. First column 402 lists downlink traffic channel rate options (0, 1, 2, 3, 4, 5, 6, 7, 8, 9, 10). Second column 404 lists the number of MAC frames (1, 2, 3, 4, 5, 6, 8, 10, 12, 14, 18) which corresponds to each of the rate options (0, 1, 2, 3, 4, 5, 6, 7, 8, 9, 10), respectively. Third column 406 lists the number of information bits (k) (224, 432, 640, 848, 1056, 1264, 1680, 2096, 2512, 2928, 3760) which corresponds to each of the rate options (0, 1, 2, 3, 4, 5, 6, 7, 8, 9, 10), respectively. Fourth column 408 lists the codeword length (n) (1344, 1344, 1344, 2624, 2624, 2624, 2624, 3936, 3936, 5248, 5248) which corresponds to each of the rate options (0, 1, 2, 3, 4, 5, 6, 7, 8, 9, 10), respectively. Fifth column 410 lists the modulation constellation used (QPSK, QPSK, QPSK, QAM16, QAM16, QAM16, QAM16, QAM64, QAM64, QAM256, QAM256) which corresponds to each of the rate options (0, 1, 2, 3, 4, 5, 6, 7, 8, 9, 10), respectively it should be noted that the codeword length for rate options using QPSK corresponds to 672 OFDM tone-symbols, while for rate options using QAM16, QAM64, or QAM256 modulation constellations, the codeword length corresponds to 656 OFDM tone-symbols.

FIG. 5 is a table 500 including exemplary downlink traffic channel assignment signaling information. First column 502 includes rate option sub-field values, the rate option sub-field using 2 bits. Second column 504 includes notes identifying the meaning associated with each rate option subfield value. First row 506 identifies that if the downlink traffic channel assignment rate option subfield bits equal 00, then rate option 0 is used in the assigned downlink traffic channel segment. Second row 508 identifies that if the downlink traffic channel assignment rate option subfield bits equal 01, then rate option 1 is used in the assigned downlink traffic channel segment. Third row 510 identifies that if the downlink traffic channel assignment rate option subfield bits equal 10, then rate option 2 is used in the assigned downlink traffic channel segment. Fourth row 512 identifies that if the downlink traffic channel assignment rate option subfield bits equal 11, then rate option 3, 4, 5, 6, 7, 8, 9 or 10 is used in the assigned downlink traffic channel segment, and the actual rate option will be signaled in a special information block of the assigned downlink traffic channel segment.

Figure 16:
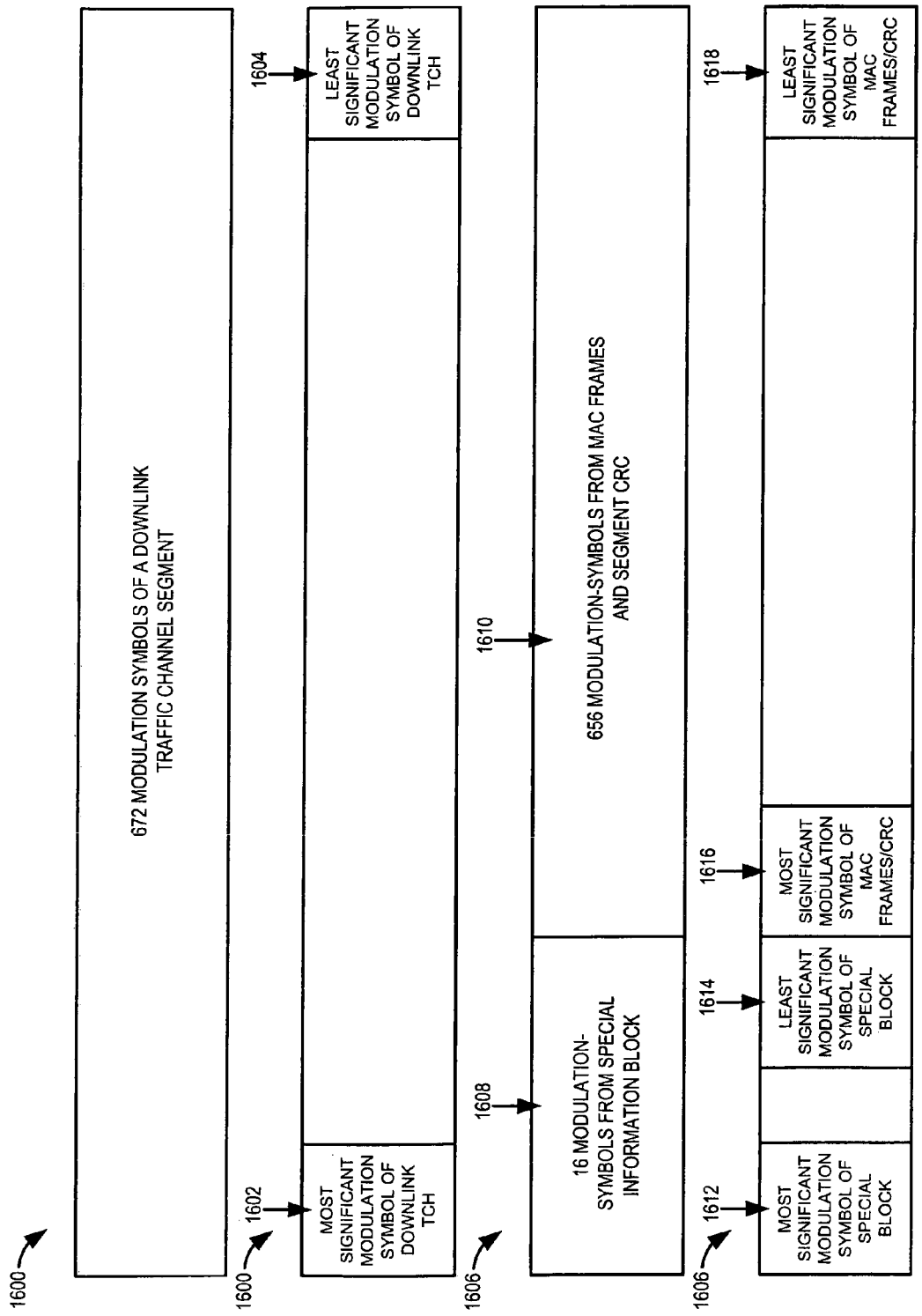
FIG. 16 illustrates exemplary downlink traffic channel segments and concatenation of modulation symbols, in accordance with various embodiments of the present invention.

FIG. 16 illustrates exemplary downlink traffic channel segments and concatenation of modulation symbols, in accordance with various embodiments of the present invention. Block 1600 illustrates an exemplary downlink traffic channel segment including 672 modulation symbols. Block 1602 indicates the position of the most significant modulation symbol of downlink traffic channel segment 1600, while block 1604 indicates the position of the least significant modulation symbol of downlink traffic channel segment 1604. Block 1606 illustrates an exemplary downlink traffic channel segment including a special information block of 16 modulation symbols 1608 and a block of 656 modulation symbols from MAC frames and segment CRC 1610. Exemplary downlink traffic channel segment 1606 may be exemplary downlink traffic channel segment 1600, in the case where a special information block is included, e.g., for rate options 3-10, where the coded user data is conveyed by a modulation technique other than QPSK, e.g., QAM16, QAM64 or QAM256. Block 1612 indicates the position of the most significant modulation symbol of the special information block 1608, while block 1614 indicates the position of the least significant modulation symbol of the special information block 1614. Block 1616 indicates the position of the most significant modulation symbol of the block including MAC frame and segment CRC information 1610, while block 1618 indicates the position of the least significant modulation symbol of the block including MAC frame and segment CRC information 1610. The blocks (1602, 1604, 1608, 1610, 1612, 1614, 1616, and 1618) of FIG. 16 are not drawn to scale, but are rather included to convey relative position information.

Figure 6:
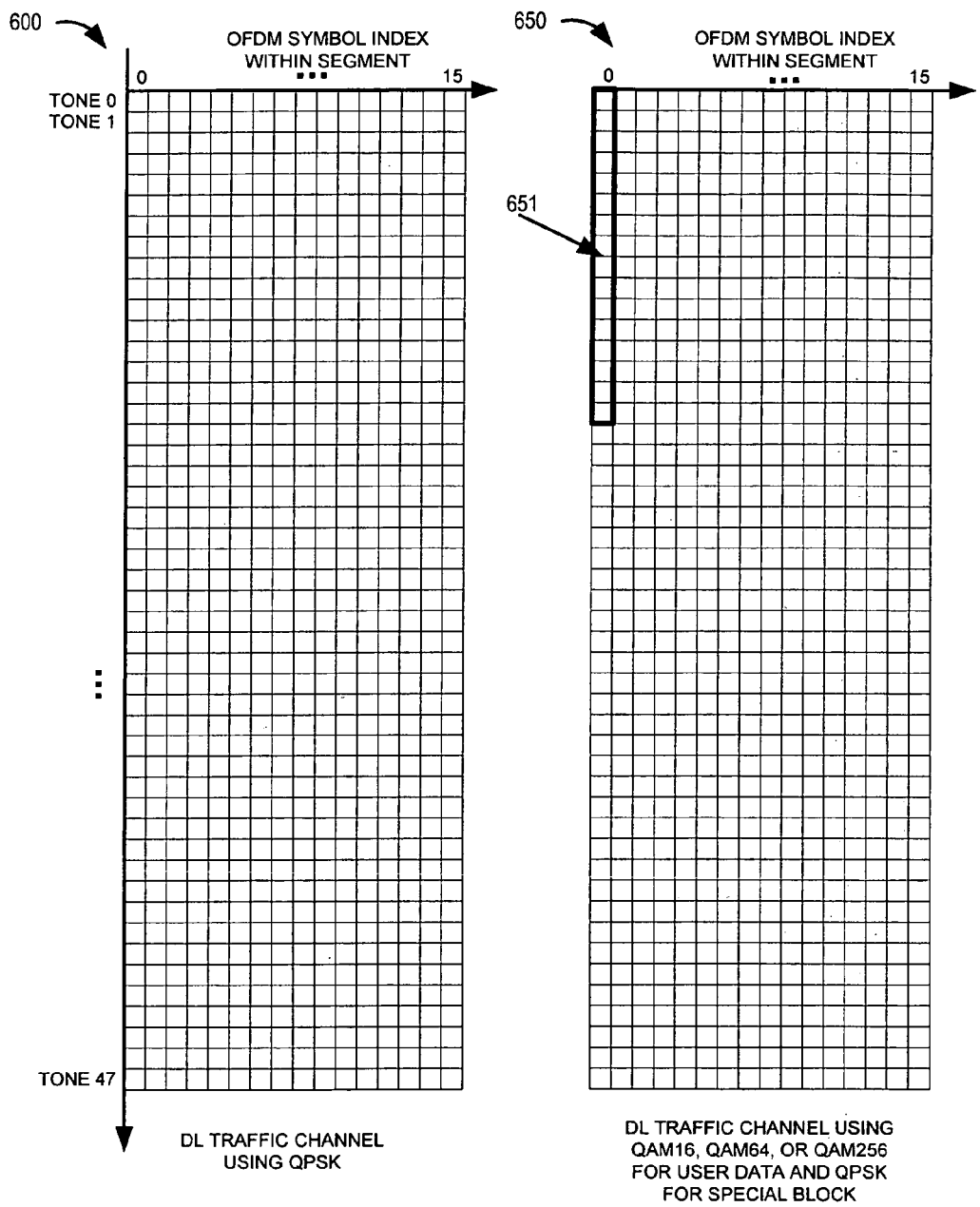
FIGS. 6, 6A, 7 and 8 show exemplary downlink traffic channel segments, in accordance with the present invention.

FIG. 6 shows two exemplary downlink traffic channel segments 600 and 650. Each exemplary downlink traffic channel segment is 48 tones wide (tone 0 . . . tone 47) and occupies a time interval of 16 OFDM symbol transmission time intervals. Each downlink traffic channel segment 600, 650 occupies air link resources of 672 OFDM tone-symbols, each OFDM tone-symbol represented by a small square box. Each tone-symbol can be used to convey a modulation symbol value. Exemplary segment 600 is representative of a downlink traffic channel segment using QPSK, e.g., rate options 0, 1, 2. Each of the 672 OFDM tone-symbols can be used to convey coded bits corresponding to the coded user data/information bits. Exemplary segment 650 is representative of a downlink traffic channel segment using QAM16, QAM64, or QAM256, e.g., rate options 3, 4, 5, 6, 7, 8, 9, or 10 to convey user data. 656 of the 672 OFDM tone-symbols can be used to convey coded bits corresponding to the coded user data/information bits. The other 16 OFDM tone-symbols, represented by special block 651 are used to convey rate option information and other information, e.g., power control information.

Figure 6A:
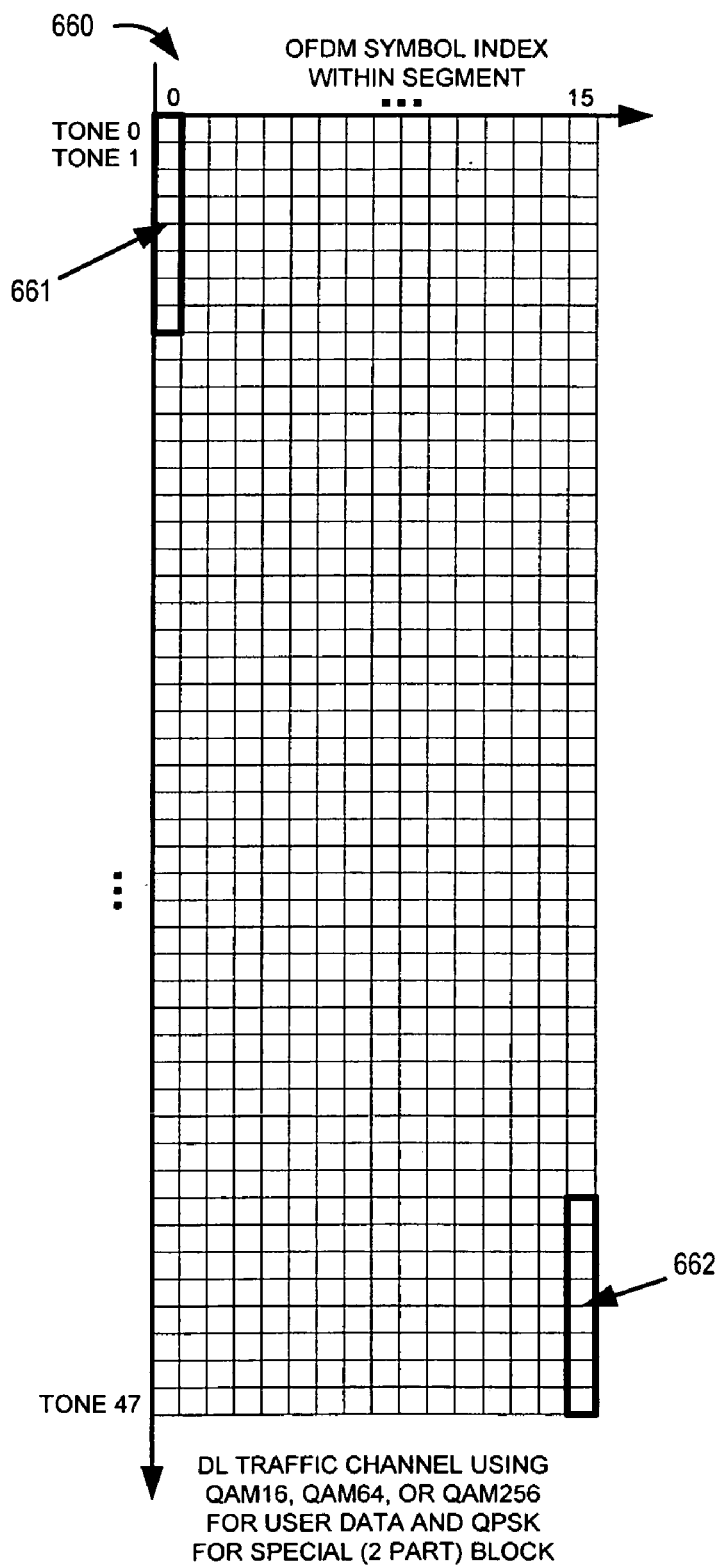

FIG. 6A shows exemplary downlink traffic channel segment 660. Exemplary downlink traffic channel segment 660 is 48 tones wide (tone 0 . . . tone 47) and occupies a time interval of 16 OFDM symbol transmission time intervals. Exemplary downlink traffic channel segment 660 occupies air link resources of 672 OFDM tone-symbols, each OFDM tone-symbol represented by a small square box. Each tone-symbol can be used to convey a modulation symbol value. Exemplary segment 660 is representative of a downlink traffic channel segment using QAM16, QAM64, or QAM256, e.g., rate options 3, 4, 5, 6, 7, 8, 9, or 10 to convey user data. 656 of the 672 OFDM tone-symbols can be used to convey coded bits corresponding to the coded user data/information bits. The other 16 OFDM tone-symbols, represented by a special block are used to convey rate option information and other information, e.g., power control information. In this embodiment of the present of invention, the special block is the composite of two smaller blocks, block 661 and block 662. Block 661 and 662 each include 8 OFDM tone-symbols and occupy different OFDM symbol index positions within the segment. By including portions of the special information block in different OFDM transmission time intervals within the downlink traffic channel segment, e.g., the first and last OFDM symbol transmission time intervals, the special information block may be made less susceptible to fading conditions, and the likelihood that the information conveyed by the special information block, including the rate option information, will be successfully recovered by the wireless terminal is increased.

Figure 7:
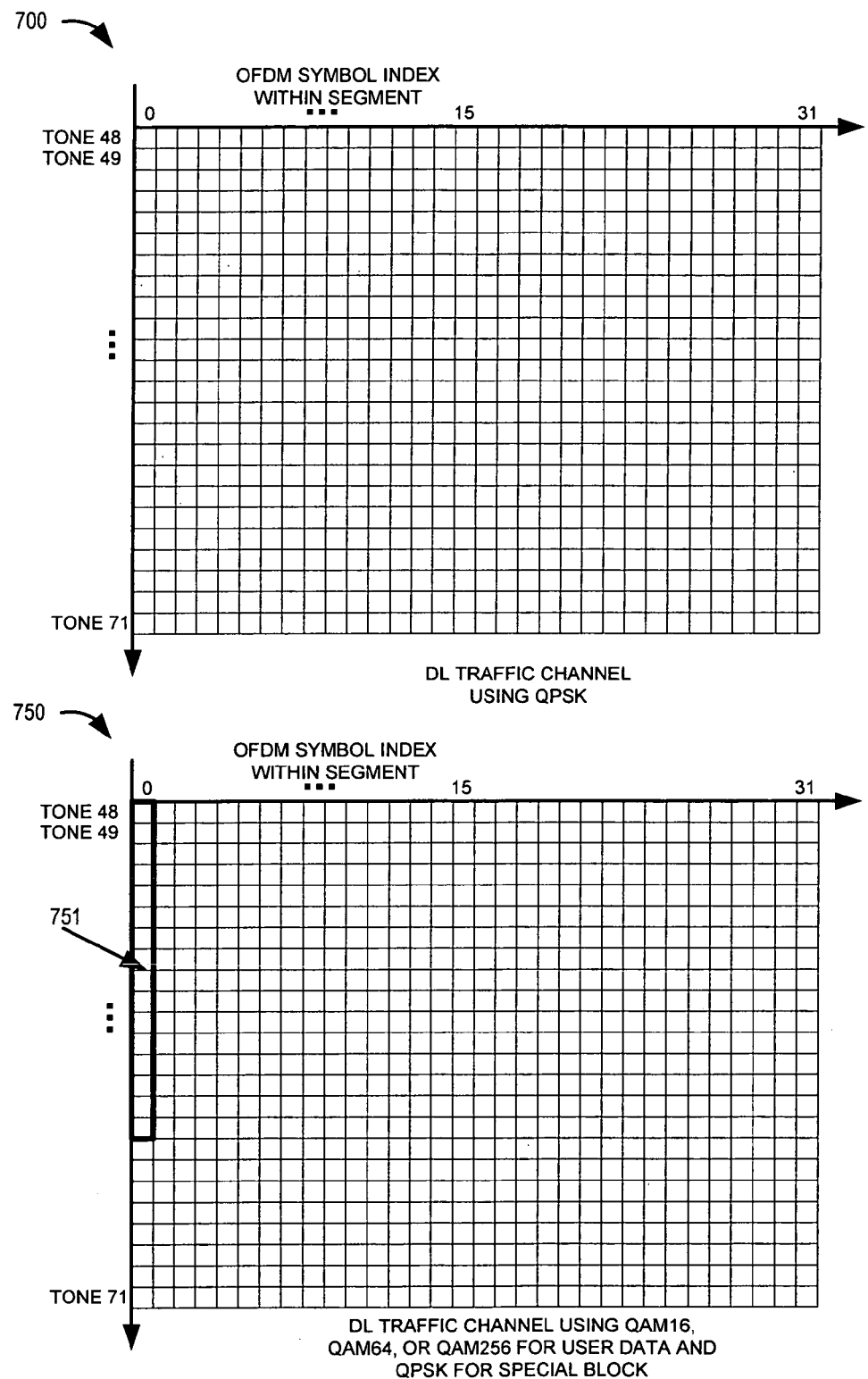

FIG. 7 shows two exemplary downlink traffic channel segments 700 and 750. Each exemplary downlink traffic channel segment is 24 tones wide (tone 48 . . . tone 71) and occupies a time interval of 32 OFDM symbol transmission time intervals. Each downlink traffic channel segment 700, 750 occupies air link resources of 672 OFDM tone-symbols, each OFDM tone-symbol represented by a small square box. Each tone-symbol can be used to convey a modulation symbol value. Exemplary segment 700 is representative of a downlink traffic channel segment using QPSK, e.g., rate options 0, 1, 2. Each of the 672 OFDM tone-symbols can be used to convey coded bits corresponding to the coded user data/information bits. Exemplary segment 750 is representative of a downlink traffic channel segment using QAM16, QAM64, or QAM256, e.g., rate options 3, 4, 5, 6, 7, 8, 9, or 10 to convey user data. 656 of the 672 OFDM tone-symbols can be used to convey coded bits corresponding to the coded user data/information bits. The other 16 OFDM tone-symbols, represented by special block 751 are used to convey rate option information and other information, e.g., power control information.

Figure 8:
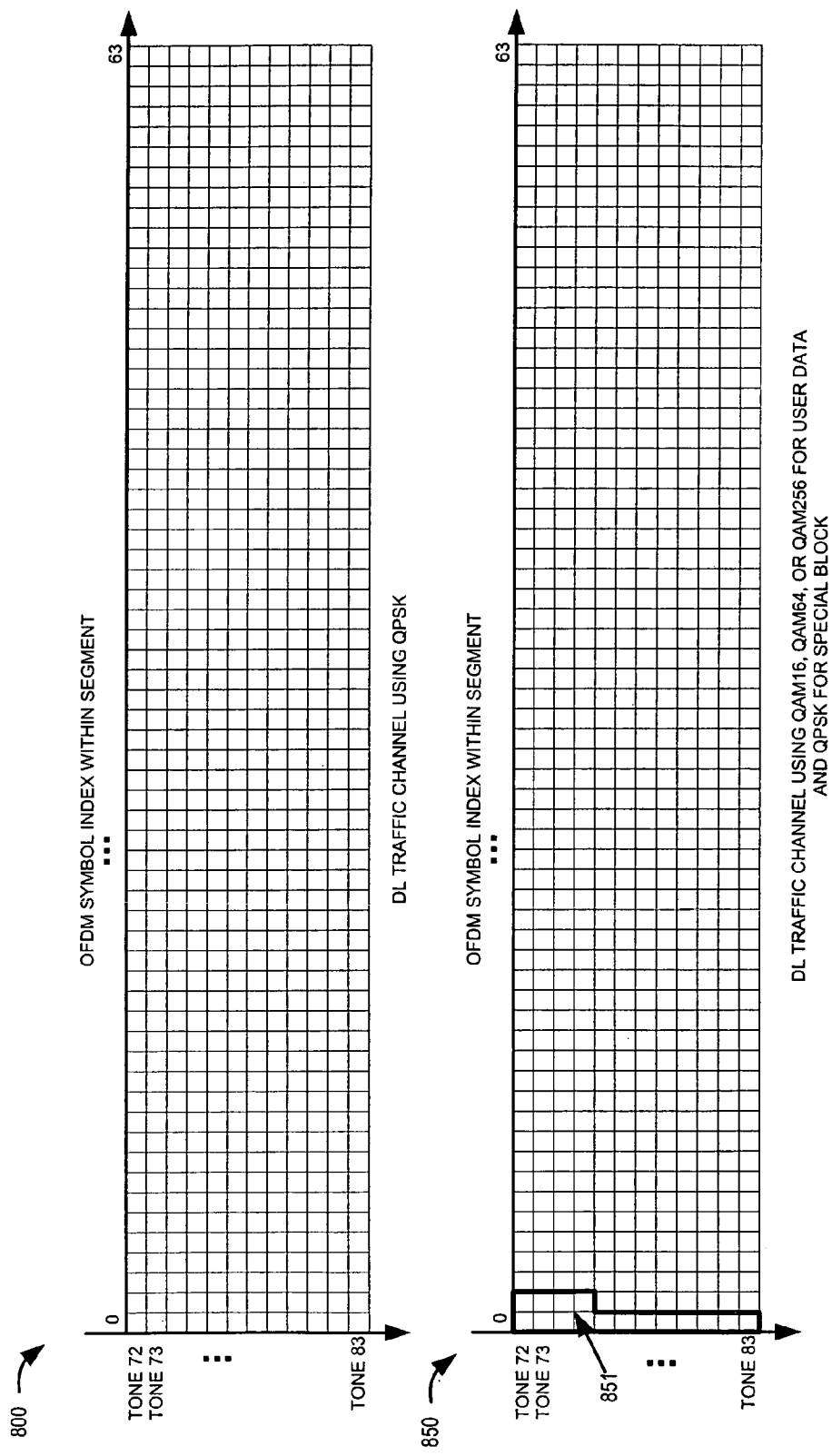

FIG. 8 shows two exemplary downlink traffic channel segments 800 and 850. Each exemplary downlink traffic channel segment is 12 tones wide (tone 72 . . . tone 83) and occupies a time interval of 64 OFDM symbol transmission time intervals. Each downlink traffic channel segment 800, 850 occupies air link resources of 672 OFDM tone-symbols, each OFDM tone-symbol represented by a small square box. Each tone-symbol can be used to convey a modulation symbol value. Exemplary segment 800 is representative of a downlink traffic channel segment using QPSK, e.g., rate options 0, 1, 2. Each of the 672 OFDM tone-symbols can be used to convey coded bits corresponding to the coded user data/information bits. Exemplary segment 850 is representative of a downlink traffic channel segment using QAM16, QAM64, or QAM256, e.g., rate options 3, 4, 5, 6, 7, 8, 9, or 10 to convey user data. 656 of the 672 OFDM tone-symbols can be used to convey coded bits corresponding to the coded user data/information bits. The other 16 OFDM tone-symbols, represented by special block 851 are used to convey rate option information and other information, e.g., power control information.

FIG. 9 is a table 900 describing downlink traffic channel segment rate option information and corresponding special information block information. First column 902 lists downlink traffic channel segment rate option ranges; second column 904 identifies whether or not the special information block is used; third column 906, identifies the format type of the special information block when used. First row 908 describes that for downlink traffic channel rate options 0-2, the special information block is not implemented. Second row 910 describes that for rate options 3-4, the special information block is included in the downlink traffic channel segment, and the special information block uses a first type format, format 1. Third row 912 describes that for rate options 5-10, the special information block is included in the downlink traffic channel segment, and the special information block uses a second type format, format 2.

FIG. 10 is a table 1000 describing an exemplary special information block in a downlink traffic channel segment using exemplary format 1. Exemplary special information block, using first type format, conveys 5 information bits. First column 1002 identifies parameters associated with the special information block; second column 1004 includes the information bit size associated with each parameter; third column 1006 describes the values the information bits can represent; four column 1008 includes notes associated with the values. First row 1010 describes that if the rate indicator parameter, represented by 1 information bit, is equal to a value of 0, then the downlink traffic channel segment uses rate option 3. Second row 1012 describes that if the rate indicator parameter, represented by 1 information bit, is equal to a value of 1, then the downlink traffic channel segment uses rate option 4. Third row 1014 describes that a transmission power indicator parameter, represented by 4 information bits, can have an integer value n in the range of 0 . . . 15, the transmission power indicator value indicating the transmission power of the downlink traffic channel segment, where the value is a non-negative integer n indicating that the per tone relative transmission power of the downlink traffic channel segment has a downlink traffic channel power offset=n/4+2 dB.

FIG. 11 is a table 1100 describing an exemplary special information block in a downlink traffic channel segment using exemplary format 2. Exemplary special information block, using second type format, conveys 8 information bits. First column 1102 identifies parameters associated with the special information block; second column 1104 includes the information bit size associated with each parameter; third column 1106 describes the values the information bits can represent; four column 1108 includes notes associated with the values. First row 1110 describes that if the rate indicator parameter, represented by 3 information bit, is equal to a value of 0, then the downlink traffic channel segment uses rate option 5. Second row 1112 describes that if the rate indicator parameter, represented by 3 information bits, is equal to a value of 1, then the downlink traffic channel segment uses rate option 6. Third row 1114 describes that if the rate indicator parameter, represented by 3 information bit, is equal to a value of 2, then the downlink traffic channel segment uses rate option 7. Fourth row 1116 describes that if the rate indicator parameter, represented by 3 information bits, is equal to a value of 3, then the downlink traffic channel segment uses rate option 8. Fifth row 1118 describes that if the rate indicator parameter, represented by 3 information bit, is equal to a value of 4, then the downlink traffic channel segment uses rate option 9. Sixth row 1120 describes that if the rate indicator parameter, represented by 3 information bits, is equal to a value of 5, then the downlink traffic channel segment uses rate option 10. Seventh row 1122 describes that if the rate indicator parameter, represented by 3 information bit, is equal to a value of 6, this is a reserved condition. Eighth row 1124 describes that if the rate indicator parameter, represented by 3 information bits, is equal to a value of 7, then this is a reserved condition. Ninth row 1126 describes that a transmission power indicator parameter, represented by 5 information bits, can have an integer value n in the range of 0 . . . 31, the transmission power indicator value indicating the transmission power of the downlink traffic channel segment, where the value is a non-negative integer n indicating that the per tone relative transmission power of the downlink traffic channel segment has a downlink traffic channel power offset=n/4+2 dB.

Figure 12:
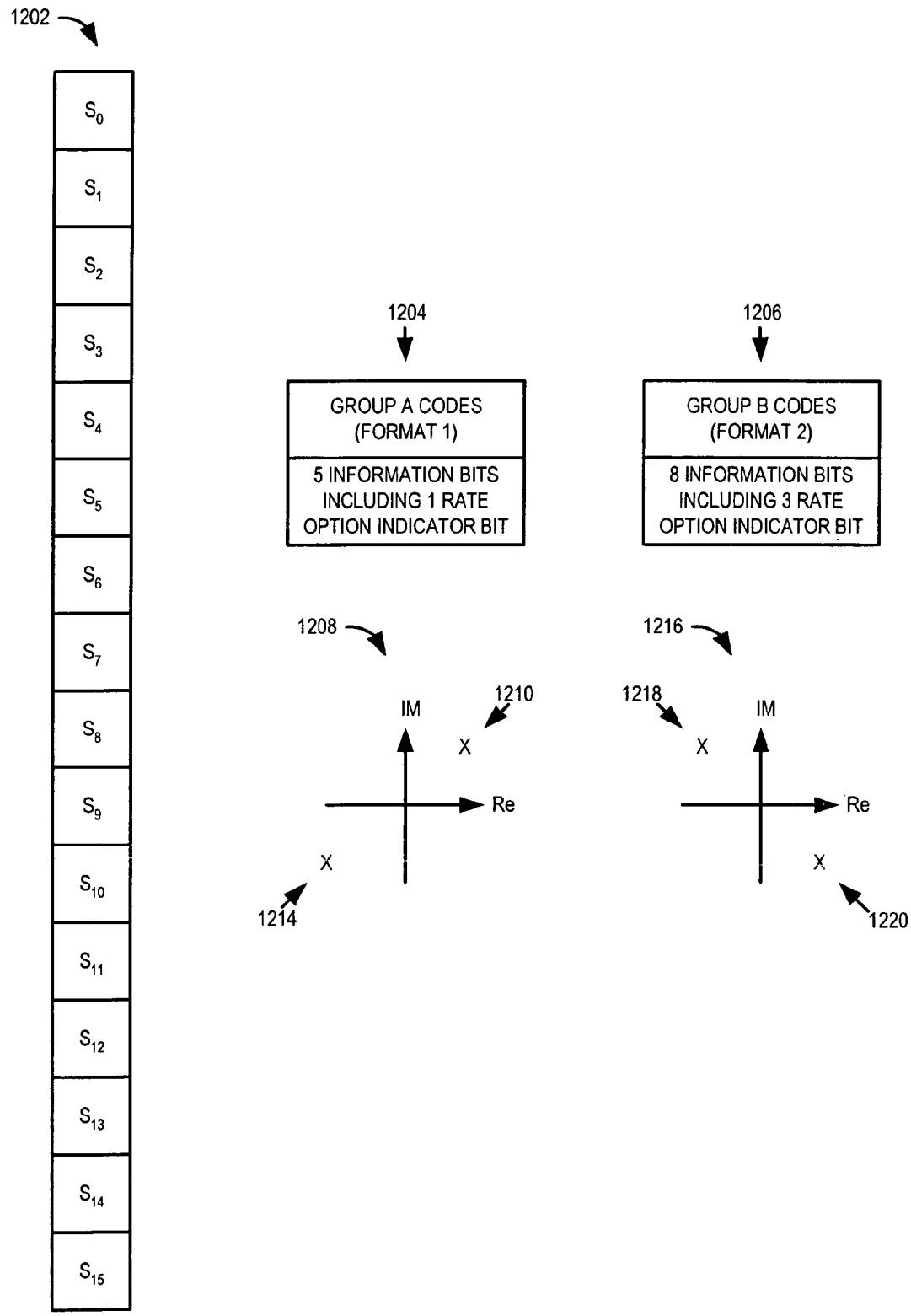
FIG. 12 includes an exemplary special information block, information identifying a first group of codes associated with an exemplary first format, and information identifying a second group of codes with an exemplary second format.

FIG. 12 includes an exemplary special information block 1202 including 16 exemplary modulation symbols (S0, S1, S2, S3, S4, S5, S6, S7, S8, S9, Sl0, S11, S12, S13, S14, S15). Table 1204 identifies that group A codes are used for a first type format to convey 5 information bits including 1 rate option indicator bit. Graph 1208, a graph of the complex plane, indicates that group A codes use QPSK modulation symbol values that may be in two designated quadrants, diagonally situated, of the four quadrants, as indicated by modulation symbol value 1210 and modulation symbol value 1214. Table 1206 identifies that group B codes are used for a second type format to convey 8 information bits including 3 rate option indicator bits. Graph 1216, a graph of the complex plane, indicates that group B codes use QPSK modulation symbol values that may be in two designated quadrants, diagonally situated, of the four quadrants, as indicated by modulation symbol value 1218 and modulation symbol value 1220. It should be noted that the two quadrants used for group A codes are different from the two quadrants used for type B codes.

In accordance with one feature of the present invention, a WT receiving a downlink traffic channel segment that is known, e.g., via the assignment signal, to include a special information block, can capture energy of the 16 modulation symbols of the special information segment, and identify which of the two possible diagonal lines the energy is being accumulated along. This will identify the format used, then the coded bits of the special information block can be decoded and the original information bits including the rate option indicator bit or bits can be recovered.

In accordance with another feature of some embodiments of the present invention, the mobile node's decoding ability can be matched to the number of bits. If the mobile node, is unable to successfully decode the small code, associated with the special information block, the mobile node is unlikely to be able to decode the coded user information bits using QAM16, QAM64, or QAM256 of the downlink traffic channel segment. In addition, in some embodiments, the special information block, when being encoded to convey a first number of information bits is matched with a first set of data rate options, while when being encoded to convey a second number of information bits is matched with a second set of data rate options, the first set of data rate options being lower than the second set of data rate options and the first number of information bits being lower than the second number of information bits. For example, consider an exemplary embodiment that uses 11 downlink traffic channel data rate options (0-10), with the lowest data rate option being data rate option 0, representing 1 frame of user data being communicated in the downlink traffic channel segment, and the highest data rate option 10, representing 18 frames of user data being communicated in the downlink traffic channel segment. In one such embodiment for the lowest set of data rate options (0-2) a special information block is not used, and a QPSK modulation constellation is used for the coded user data bits; for an intermediate level of data rate options (3-4) a special information block is used with 5 information bits including 1 data rate option bit, and a QAM16 modulation constellation is used for coded user data bits; for a high level of data rate options (5-10) a special information block is used with 8 information bits including 3 information bits for conveying data rate options, and one of a QAM16, QAM64, or QAM256 modulation constellation is used for coded user data bits, with the one of QAM16, QAM64 or QAM256 being a function of data rate option.

Figure 13:
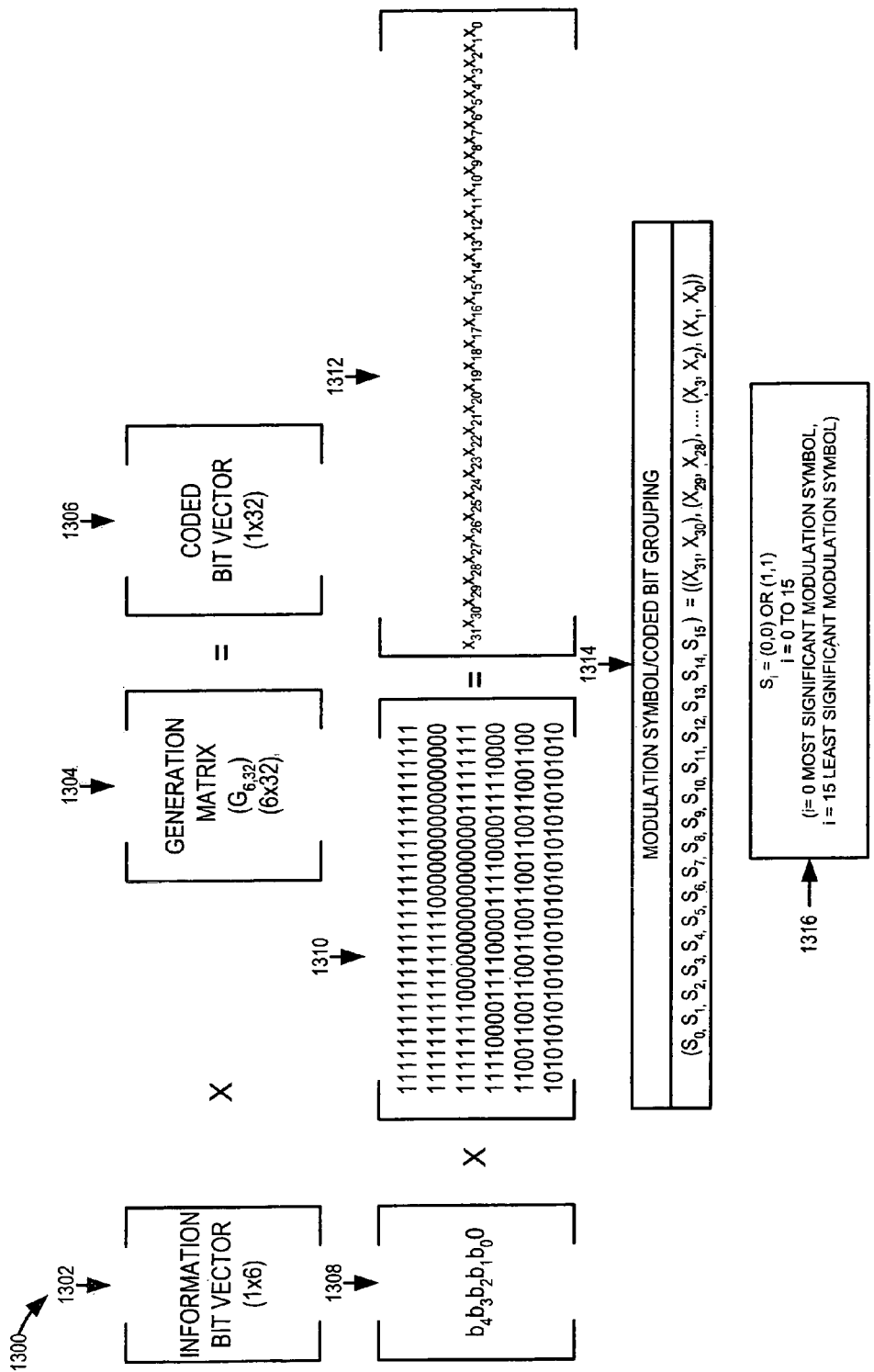
FIG. 13 is a drawing illustrating exemplary information bit to coded bit processing and exemplary coded bit to modulation symbol mapping for a special information block of a downlink traffic channel segment using an exemplary first format, in accordance with the present invention.

FIG. 13 is a drawing 1300 illustrating exemplary information bit to coded bit processing and exemplary coded bit to modulation symbol mapping for a special information block of a downlink traffic channel segment using a first format, in accordance with the present invention. FIG. 13 illustrates processing and mapping for an exemplary first format which obtains 32 coded bits from 5 information bits, including 1 rate indicator option bit, and maps the coded bits to 16 modulation symbols of the special information block. Information bit vector 1302 is multiplied by generation matrix $(G_{6,32})$ 1304 to generate a coded bit vector 1306, where each element of the vectors and matrix is either a 0 or 1. Information bit vector $(b_4 b_3 b_2 b_1 b_0 0)$ 1308 can be information bit vector 1302, where each bit $b_4, \ldots, b_0$ is one of the 5 information bits, and one of the information bits, e.g., $b_4$, can be the rate option indicator bit. Generation matrix 1310, using Reed-Muller codes, can be generation matrix 1304, and coded output bit vector $(X_{31}, X_{30}, \ldots, X_0)$ 1312 can be coded bit vector 1306. Block 1314 shows exemplary mapping of coded bit pairs from vector 1312 to modulation symbols. Block 1316 illustrates that the modulation symbol S0 is designated the most significant modulation symbol, while the modulation symbol S15 is designated the least significant modulation symbol and that each of the sixteen modulation symbol represents either the coded bit pair (0,0) or (1,1).

Figure 14:
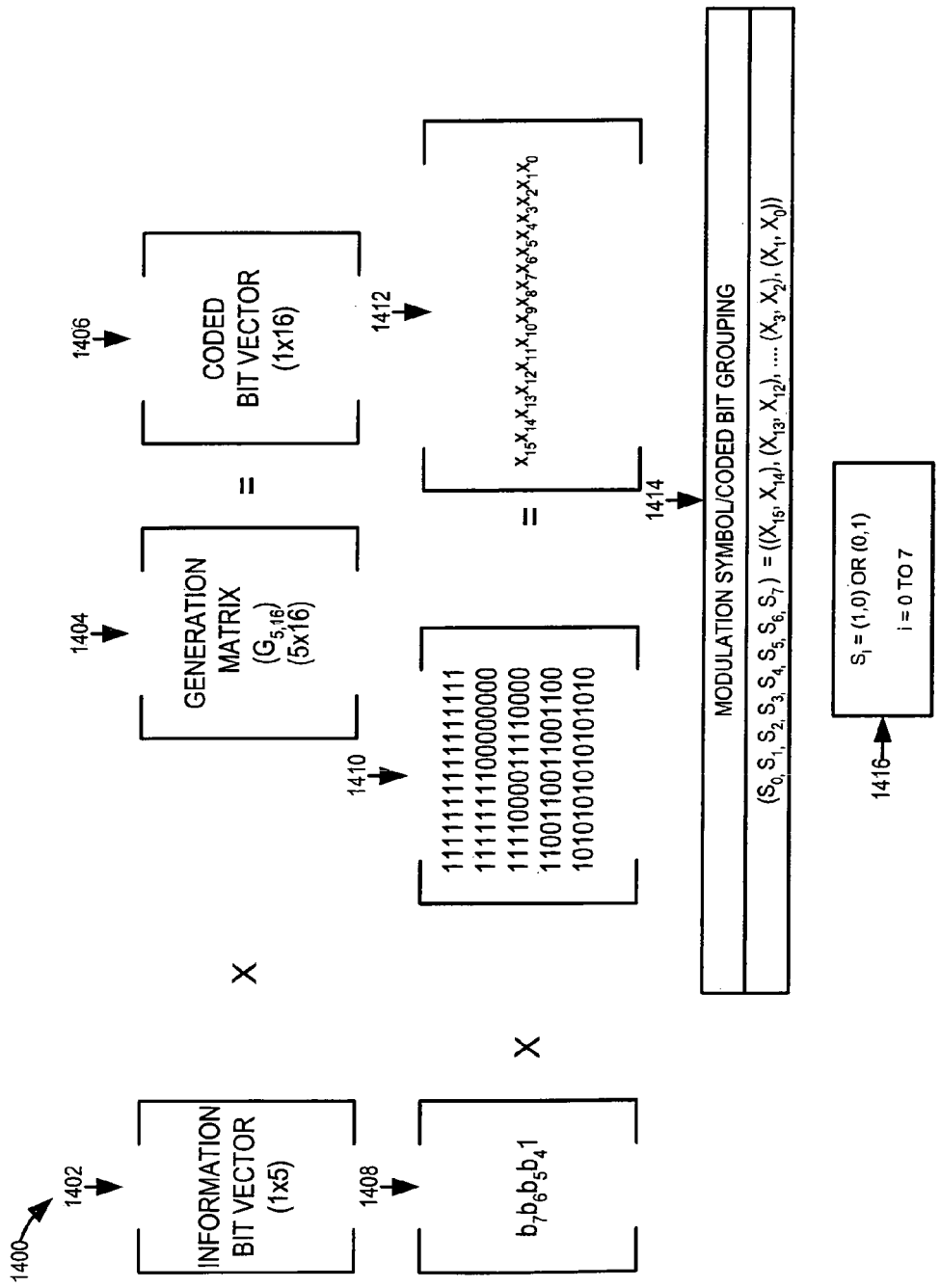
FIG. 14 and FIG. 15 in combination is a drawing illustrating exemplary information bit to coded bit processing and exemplary coded bit to modulation symbol mapping for a special information block of a downlink traffic channel segment using an exemplary second format, in accordance with the present invention.
Figure 15:
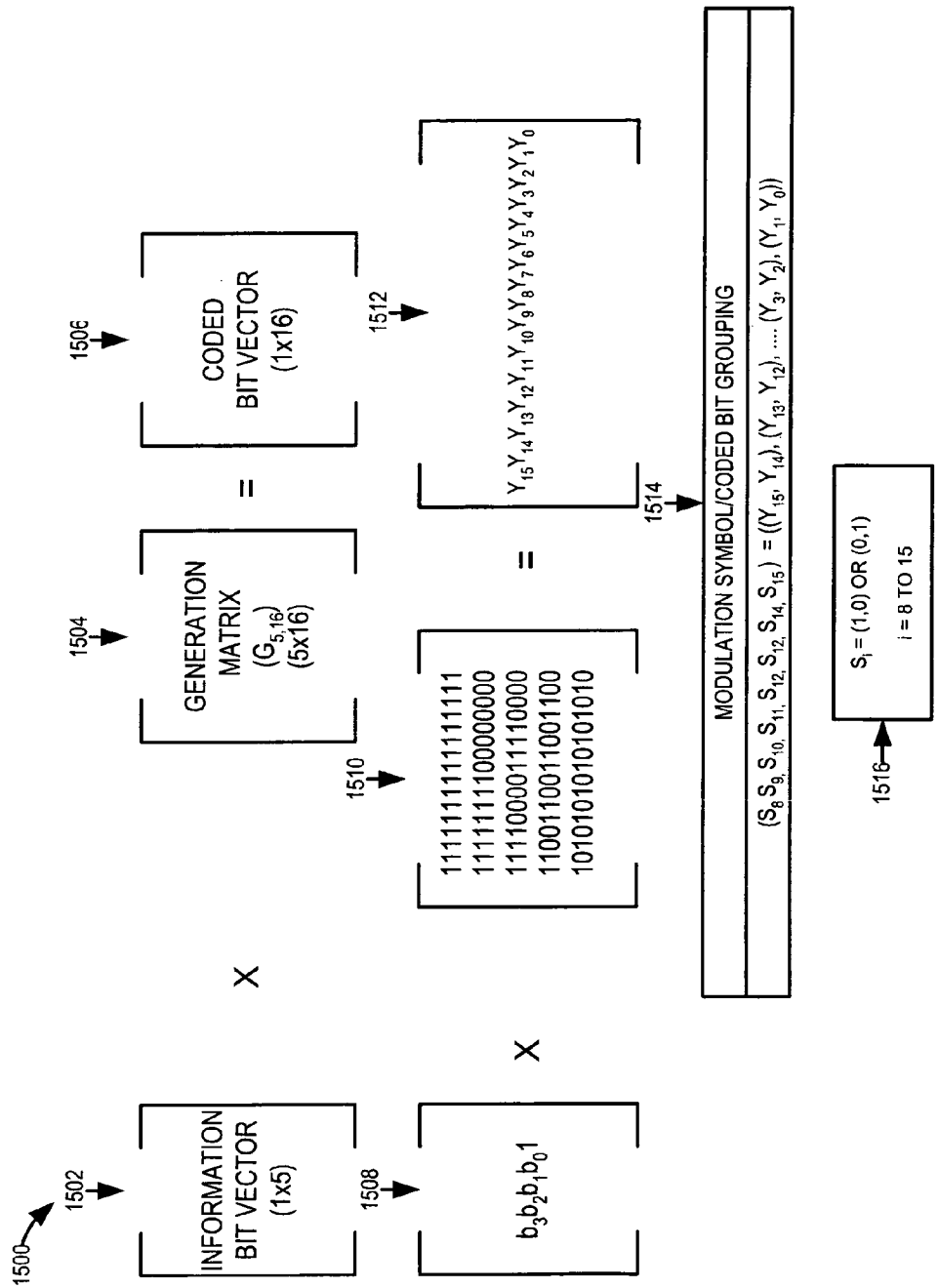

FIG. 14 and FIG. 15 are drawings (1400, 1500) illustrating (first, second) portions of exemplary information bit to coded bit processing and exemplary coded bit to modulation symbol mapping for a special information block of a downlink traffic channel segment using a second format, in accordance with the present invention. FIG. 14 and FIG. 15, in combination, illustrate processing and mapping for an exemplary second format which obtains 32 coded bits from 8 information bits, including 3 rate indicator option bit, and maps the coded bits to 16 modulation symbols of the special information block. Information bit vector 1402 is multiplied by generation matrix $(G_{5,16})$ 1404 to generate a coded bit vector 1406, where each element of the vectors and matrix is either a 0 or 1. Information bit vector $(b_7 b_6 b_5 b_4 1)$ 1408 can be information bit vector 1402, where each bit $b_7, \ldots, b_4$ is one of the 8 information bits, and three of the information bits, e.g., $b_7, b_6, b_5$, can be the rate option indicator bits. Generation matrix 1410, using Reed-Muller codes, can be generation matrix 1404, and coded output bit vector $(X_{15}, X_{14}, \ldots, X_0)$ 1412 can be coded bit vector 1406. Block 1414 shows exemplary mapping of coded bit pairs from vector 1412 to 8 modulation symbols. Block 1416 illustrates that the modulation symbol $S_0$ is designated the most significant modulation symbol and that each of the eight modulation symbol represents either the coded bit pair (1,0) or (0,1). Information bit vector 1502 is multiplied by generation matrix $(G_{5,16})$ 1504 to generate a coded bit vector 1506, where each element of the vectors and matrix is either a 0 or 1. Information bit vector $(b_3 b_2 b_1 1)$ 1408 can be information bit vector 1402, where each bit $b_7, \ldots, b_4$ is one of the 8 information bits. Generation matrix 1510, using Reed-Muller codes, can be generation matrix 1504, and coded output bit vector $(Y_{15}, Y_{14}, \ldots, Y_0)$ 1512 can be coded bit vector 1506. Block 1514 shows exemplary mapping of coded bit pairs from vector 1512 to 8 modulation symbols. Block 1516 illustrates that the modulation symbol $S_{15}$ is designated the least significant modulation symbol and that each of the eight modulation symbol represents either the coded bit pair (1,0) or (0,1).

In some embodiments, the 3 coded rate option bits may be included in information bit vector 1508 rather than in information bit vector 1408; while in other embodiments, the three rate option indicator bits may be partitioned between information bit vector 1408 and 1508 with some rate option indicator bits included in each vector 1408, 1508.

Consider that coded bit pattern (0,0) is mapped to represent as a QPSK modulation symbol in a first quadrant, e.g., with a value (1+i) in the complex plane, coded bit pattern (1,1) is mapped to represent a QPSK modulation symbol in a second, diagonally opposed, quadrant, e.g., with a value (−1−i) in the complex plane, coded bit pattern (1,0) is mapped to represent a QPSK modulation symbol in a third quadrant, e.g., with a value of (1, −i), and coded bit pattern (0,1) is mapped to represent a QPSK modulation symbol in a fourth, diagonally opposed to the third quadrant, quadrant, e.g., with a value (−1, i) in the complex plane. If the special information block in the first type format, each of the sixteen modulation symbol values will be in a first set of two, while if the special information block is of the second type format, each of the sixteen modulation symbols will be in a second set of two, said second set being mutually exclusive from said first set. A wireless terminal receiving the special information block modulation signals, can first determine which of the two sets the signals correspond to, can determine the corresponding format type used, and can decode the signals using the determined format type recovering the rate option being conveyed.

Figure 17:
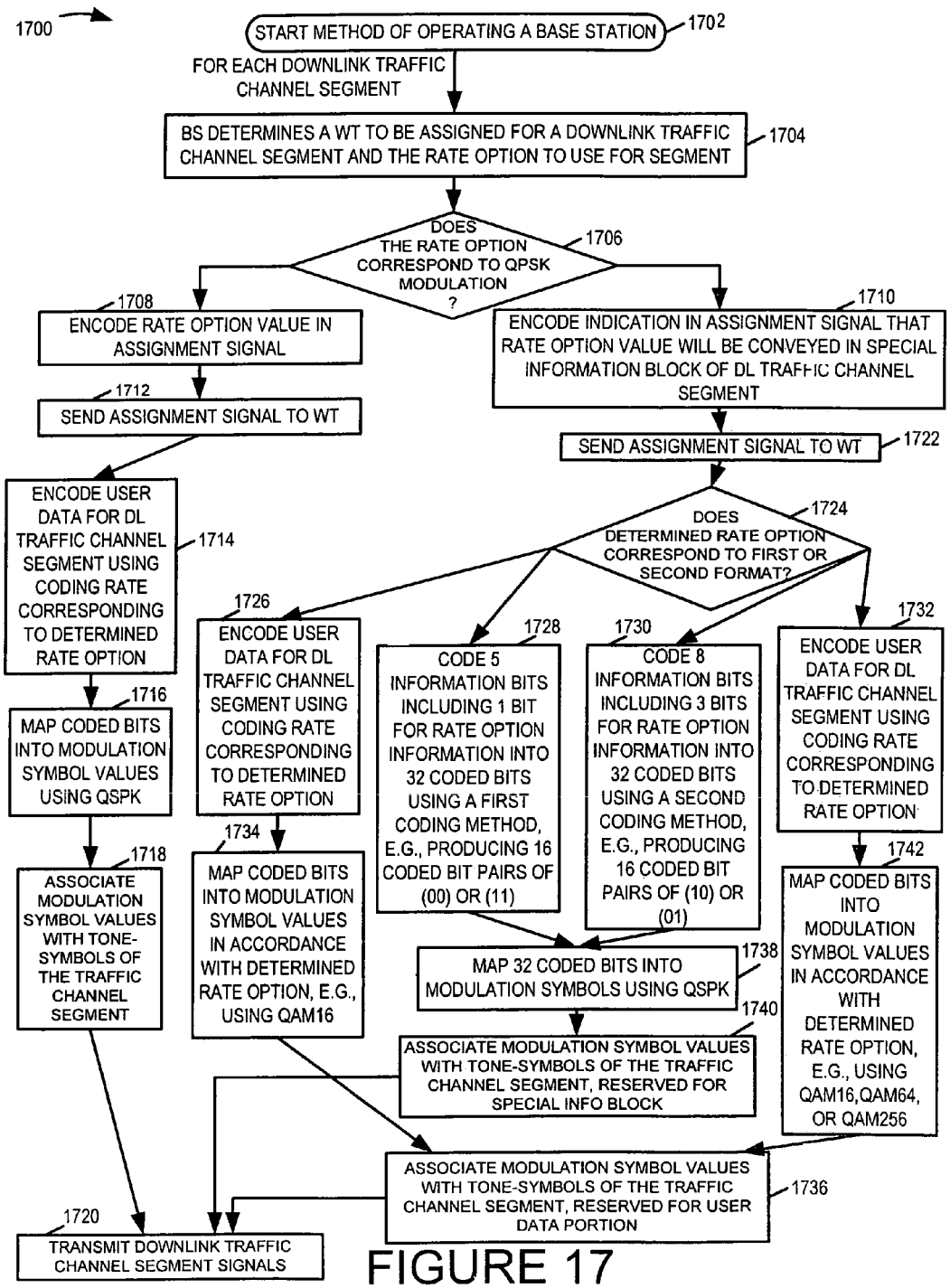
FIG. 17 is a flowchart of an exemplary method of operating a base station, in accordance with the present invention.

FIG. 17 is a flowchart 1700 of an exemplary method of operating a base station, in accordance with the present invention. Operation starts in step 1702, where the base station is powered on and initialized. For each downlink traffic channel segment, operation proceeds to step 1704. In step 1704, the base station determines a wireless terminal to be assigned for the downlink traffic channel segment and the rate option, e.g., a data rate option corresponding to coding rate information and modulation scheme, to use for the segment. In some embodiments, the base station may assign a downlink traffic channel segment to more than one user, e.g., as part of a multi-cast assignment or a broadcast. In some embodiments, where there is no user information to be transmitted for a particular downlink traffic channel segment, e.g., due to low system loading levels, the base station may leave the segment unassigned or transmit a dummy assignment signifying that the segment is unassigned, and subsequently not transmit for that downlink traffic channel segment. The determination of which wireless terminal receives the assignment for the downlink traffic channel segment and the rate option of the segment may be determined in accordance with the policy rules of the base station's scheduler and may include using interference level information, e.g., derived, in part, from feedback reports such as beacon ratio reports received from the wireless terminals. Operation proceeds from step 1704 to step 1706.

In step 1706, the base station determines whether the determined rate option for the downlink traffic channel segment corresponds to QPSK modulation or to a different modulation scheme, e.g., one of QAM16, QAM64, QAM256. For example, the downlink traffic channel may support eleven different rate options, each rate option being associated with a coding rate and a modulation scheme, and rate options 0, 1, and 2, the lowest three data rate options of the eleven, may use QPSK modulation. If the determination of step 1706, is that the determined rate option corresponds to QPSK modulation, then operation proceeds to step 1708; otherwise, operation proceeds to step 1710.

In step 1708, the base station encodes the rate option for the downlink traffic channel segment in the assignment signal corresponding to the downlink traffic channel segment, e.g., indicating rate option 0, 1, or 2. In some embodiments, there is fixed predetermined association linking assignment signals with downlink traffic channel segments with the downlink timing structure. Then, in step 1712 the base stations sends the assignment signal to the wireless terminal via downlink signaling. Operation proceeds from step 1712 to step 1714. In step 1714, the base station encodes user data for the downlink traffic channel segment using the coding rate corresponding to the determined rate option. Operation proceeds from step 1714 to step 1716. In step 1716, the base station maps coded bits from the operation of step 1714, into modulation symbol values using QPSK. Operation proceeds from step 1716 to step 1718. In step 1718, the base station is operated to associate modulation symbol values with tone-symbols of the traffic channel segment. Then, in step 1720, the base station is operated to transmit downlink traffic channel segment signals.

Returning to step 1706, if in step 1706 the determined rate option did not correspond to QPSK modulation, then operation proceeds from step 1706 to step 1710. For example, the downlink traffic may support eleven different rate options for the downlink traffic channel segment and the 8 highest data rate options, rate options 3-10, may correspond to non-QPSK modulation. In step 1710, the base station is operated to encode information in the assignment signal, corresponding to the downlink traffic channel segment, indicating that the specific rate option value for the downlink traffic channel segment will be conveyed in a special information block of the downlink traffic channel segment. For example, the assignment signal can have a field including two bits associated with rate option information, and when the value of those two bits is a particular pattern, e.g., 11, that pattern signifies that the rate option value for the downlink traffic channel segment will be conveyed in a special information block of the segment, and that the rate option value will be within a range, e.g., 3-10. Operation proceeds from step 1710 to step 1722, where the base station is operated to send the assignment signal to the wireless terminal. Operation proceeds from step 1722 to step 1724.

In step 1724, the base station is operated to determine if the determined rate option corresponds to a first or second format. For example, exemplary rate options 3-10 may be partitioned to correspond to two different formats, used for the special information block. A first format may correspond to lower data rates, e.g., rate options 3-4 and a second format may correspond to higher data rate, e.g., rate options 5-10. If it is determined in step 1724 that the determined rate option corresponds to the first special block format, then operation proceeds to steps 1726 and 1728; while if it is determined in step 1724, that the determined rate option corresponds to the second special block format, then operation proceeds to steps 1730 and 1732.

In step 1726, the base station is operated to encode the user data for the downlink traffic channel segment using the coding rate corresponding to the determined rate option, e.g., one of rate options 3 or 4. Operation proceeds from 1726 to step 1734, where the base station is operated to map the coded bits from step 1726 into modulation symbol values in accordance with the determined rate option, e.g., using QAM16.

In step 1728, the base station is operated to code 5 information bits including one bit for rate option information into 32 coded bits using a first coding method, e.g., producing 16 coded bit pairs, with each coded bit pair being one of (00) or (11). In some embodiments, Reed-Muller codes are used in step 1728.

In step 1732, the base station is operated to encode the user data for the downlink traffic channel segment using the coding rate corresponding to the determined rate option, e.g., one of rate options 5, 6, 7, 8, 9, 10. Operation proceeds from 1732 to step 1742, where the base station is operated to map the coded bits from step 1732 into modulation symbol values in accordance with the determined rate option, e.g., using QAM16 corresponding to rate options 5-6, QAM64 corresponding to rate options 7-8, or QAM256 corresponding to rate options 9-10.

In step 1730, the base station is operated to code 8 information bits including three bits for rate option information into 32 coded bits using a second coding method, e.g., producing 16 coded bit pairs, with each coded bit pair being one of (10) or (01). In some embodiments, Reed-Muller codes are used in step 1730.

Operation proceeds from step 1728 or step 1730 to step 1738, where the base station is operated to map the 32 coded bits into modulation symbols using QPSK. Operation proceeds from step 1738 to step 1740, where the base station is operated to associate modulation symbol values with tone-symbols of the downlink traffic channel segment reserved for special block information.

Operation proceeds from step 1734 or step 1742 to step 1736, where the base station is operated to associate modulation symbol values from steps 1734 or step 1742 with tone-symbols of the traffic channel segment reserved for the user data portion.

Operation proceeds from step 1740 and step 1736 to step 1720, where the base station is operated to transmit downlink traffic channel segment signals.

Downlink traffic channel segment assignment signals used in some but not necessarily all embodiments of the present invention have a fixed predetermined relationship in terms of transmission time and/or frequency to the traffic channel segment being assigned by the assignment signal. A downlink assignment signal in various embodiments of the invention may include a wireless terminal identifier that corresponds to an individual wireless terminal, a group of active wireless terminals, or a null group of wireless terminals where the null group is a wireless terminal group in which, in some embodiments, no active wireless terminals are assigned and which is used for segments which are not intended to carry data for an active terminal, e.g., segments which go unused. Thus, in the case of a multicast transmission, a WT group identifier may be included in the assignment signal and the members of the group would listen and use the assigned downlink traffic segment.

FIG. 18 is a drawing of a flowchart 1800 of an exemplary method of operating a wireless terminal in accordance with the present invention. The exemplary method starts in step 1802, where the wireless terminal is powered on and initialized. Operation proceeds from step 1802 to step 1804, where the wireless terminal receives a downlink traffic segment assignment signal. Operation proceeds from step 1804 to step 1806. In step 1806, the wireless terminal decodes received assignment signal information indicating the assigned wireless terminal or terminals corresponding to the assigned downlink traffic channel segment. The downlink traffic channel segment assignment may be a unicast assignment corresponding to a single WT or the downlink traffic channel segment assignment may be a multicast assignment corresponding to a group of WTs. Operation proceeds from step 1806 to step 1808.

In step 1808, the WT determines whether or not the received downlink traffic channel assignment is directed toward the WT. If in step 1808, the WT determines that the assignment is not directed toward itself, operation proceeds from step 1808 back to step 1804 where the WT receives additional downlink traffic channel segment assignment signals. However, if in step 1808, the WT determines that the assignment was directed to itself, then operation proceeds from step 1808 to step 1810 and step 1812.

In step 1810, the WT further decodes received assignment signal information indicating rate option information to obtain a data rate option indicator value or an indication that the data rate option indicator value is included in the corresponding downlink traffic channel segment. For example, the WT may support 11 downlink data rate options as shown in FIG. 4, the assignment signal may include a rate option field of 2 bits where pattern 00 indicates data rate option 0, pattern 01 indicates data rate option 1, pattern 10 indicates data rate option 2, and pattern 11 indicates that the rate option will be indicated in the corresponding downlink traffic channel segment in a special information block portion and that the rate option will be one of rate options 3-10.

In step 1812, the WT receives the traffic channel segment signals corresponding to the assigned segment obtaining received traffic channel segment signals 1814. The received traffic channel signals 1814 are used as input to steps 1820 and/or 1828.

Operation proceeds from step 1810 to step 1816. In step 1816, the WT determines if the decoded rate option information indicates a specific data rate option that is being used in the downlink traffic channel segment. If the decoded rate option information does include a specific indicated data rate option, then operation proceeds to step 1818; otherwise operation proceeds to step 1820.

In step 1818, the WT determines from the indicated data rate option, one or more of a modulation method, coding rate and modulation symbol mapping for the downlink traffic channel segment. For example, data rate 0 may correspond to a QPSK modulation constellation, 224 information bits, 1344 coded bits, and each of the OFDM tone-symbols of the downlink traffic channel segment corresponding to mapped coded bits of user data; if data rate 1 may correspond to a QPSK modulation constellation, 432 information bits, 1344 coded bits, and each of the OFDM tone-symbols of the downlink traffic channel segment corresponding to mapped coded bits of user data; data rate 2 may correspond to a QPSK modulation constellation, 640 information bits, 1344 coded bits, and each of the OFDM tone-symbols of the downlink traffic channel segment corresponding to mapped coded bits of user data. For example, the downlink traffic channel segment may include 768 OFDM tone-symbols and each of the 768 OFDM tone-symbols may be used to convey QPSK modulation symbols of mapped coded user data bits for each of data rate options 0, 1, or 2. Operation proceeds from step 1818 to step 1828.

In step 1820, the wireless terminal decodes the special information block portion of the received traffic channel segment signals 1814 to obtain the data rate option used for the user data portion of the downlink traffic channel segment. For example in an exemplary system, the downlink traffic channel segment may include 768 OFDM tone-symbols, and when using data rate options 3-10, the downlink traffic channel segment is partitioned into a special information block of 16 tone-symbols and a user data block of 752 tone-symbols. Step 1820 includes sub-step 1822 and sub-step 1824. In sub-step 1822, the wireless terminal determines whether the recovered modulation symbols of the special information block belong to a first or a second set of codes. For example, the special information block may use QPSK modulation symbols and the first set of codes may use QPSK modulation symbols (0,0) and (1,1), while the second set of codes may use QPS modulation symbols (1,0) or (0,1). In sub-step 1824 the wireless terminal decodes the coded bits conveyed in the special information block according to a first format for the first set of codes or according to a second format for the second set of codes. For example, the first set of codes may correspond to a first format where 5 information bits including 1 rate option indicator bits are conveyed, e.g., indicating rate option 3 or data rate option 4 of FIG. 4; while the second set of codes may correspond to a second format where 8 information bits including 3 rate indicator bits are conveyed, e.g., indicating one of rate option 5-10 of FIG. 4. The WT having determined the set of codes in sub-step 1822, decodes according to the appropriate format in step 1824, recovering the data rate option indicator value. Operation proceeds from step 1820 to step 1826.

In step 1826, the WT determines, from the determined indicated data rate option, one or more of a modulation method, coding rate, and modulation symbol mapping for the downlink traffic channel segment. For example, consider that step 1824 determines one of data rate options 3-10 indicated in FIG. 4, with its associated coding rate, modulation constellation, e.g., QAM16, QAM64 or QAM256, and mapping of coded user data bits to 752 tone-symbols of the downlink traffic channel segment. Operation proceeds from step 1826 to step 1828.

In step 1828, the WT recovers, e.g., via demodulation and decoding, the user data information bits communicated in the downlink traffic channel segment using the determined modulation symbol mapping information, modulation method information, and coding rate information obtained from either step 1818 or step 1826. Step 1828 includes the processing of received traffic channel signals 1814, e.g., those associated with user data.

This application is directed to numerous methods and apparatus which can be used to implement a communications system based on OFDM, CDMA and/or a variety of other communications methods. Accordingly, while described in the context of an OFDM system, many of the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, signal processing. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a base station, the base station in communication with a wireless terminal, the method comprising:
   transmitting from the base station in a first portion of a first communications segment encoded data rate option information over a downlink channel to the wireless terminal; and
   transmitting from the base station in a second portion of said first communications segment encoded user data over the downlink channel,
   wherein selected data rate option information is provided in an assignment signal separate from the communications segment.

2. The method of claim 1, wherein said step of transmitting the encoded data rate option information includes modulating said encoded data rate option information using a first modulation method which is different from a modulation method used to modulate said encoded user data.

3. The method of claim 1, wherein encoded data rate option information is encoded using a different encoding method than the encoding method used to encode said user data.

4. The method of claim 1, further comprising:
   selecting a data rate option, prior to transmitting said first and second portions of said first communications segment, said data rate option corresponding to one of a plurality of different data rate option groupings, each of said different data rate option groupings corresponding to a different data rate option indicator encoding method, a first grouping in said plurality of groupings corresponding to a first data rate option indicator encoding method wherein the selected data rate option is indicated in an assignment signal separate from the communications segment, a second grouping in said plurality of groupings corresponding to a second data rate option indicator encoding method in which data rate option information is included in the communications segment, said data rate option selected for said first communications segment being in said second grouping.

5. The method of claim 4, wherein said first data rate option indicator method uniquely identifies the data rate option selected to be used to encode the user data in a communications segment and wherein when said first data rate option indicator method is used the communications segment for which the option was selected does not include encoded data rate option information.

6. The method of claim 3, further comprising determining the encoding method to be used for said encoded data rate option information based on the data rate option to be communicated.

7. The method of claim 6, wherein the step of determining the encoding method includes selecting a first encoding method which encodes a single bit rate option indicator; and wherein a second encoding method encodes a multi-bit rate option indicator.

8. The method of claim 6, wherein the step of determining the encoding method includes selecting a second encoding method which encodes a multi-bit rate option indicator; and wherein a first encoding method encodes a single bit rate option indicator.

9. The method of claim 2, wherein the encoded data rate option information is modulated using QPSK and wherein the encoded user data is modulated using one of QAM16, QAM64 and QAM256.

10. The method of claim 1, further comprising: transmitting a first assignment signal communicating a first number of bits used to provide data rate option information corresponding to the first communications segment, said first number of bits being less than the number of bits required to uniquely identify each data rate option in a full set of supported data rate options.

11. The method of claim 10, wherein said assignment signal data rate option information indicates that additional data rate option information is included in the communications segment.

12. The method of claim 11, wherein the data rate option corresponding to said first communications segment is the highest supported data rate option in said full set of supported data rate options.

13. The method of claim 11, further comprising: transmitting a second assignment signal used to assign a second communication segment to said first wireless terminal, the second assignment signal communicating a second number of bits used to provide data rate option information corresponding to the second communications segment, said second number of bits being the same as said first number of bits and being less than the number of bits required to uniquely identify each data rate option in a full set of supported data rate options, said second assignment signal indicating the actual data rate option corresponding to said second communication segment.

14. The method of claim 13, wherein said actual data rate option is the lowest supported data rate option.

15. The method of claim 14, wherein said lowest supported data rate option is a QPSK data rate option.

16. The method of claim 15, wherein said first assignment signal includes a first identifier indicating the wireless terminal or group of wireless terminals to which said first communications segment is assigned; and wherein said second assignment signal includes a second identifier which indicates a wireless terminal or group of wireless terminals to which the second communication segment is assigned.

17. The method of claim 15, further comprising: transmitting the second communications segment including encoded user data.

18. The method of claim 17, wherein the first communications segment and the second communications segment are traffic channel segments.

19. The method of claim 18, wherein the first communications segment and the second communications segment represent the same designated logical segment in a repetitive downlink timing and frequency structure but at different times.

20. The method of claim 19, wherein the first and second communications segments convey the same number of modulation symbols.

21. The method of claim 20, wherein the first communications segment conveys a mixture of modulation symbol values associated with a user data coded block and modulation symbol values associated with non-user data, said modulation symbol values associated with non-user data including data rate option information; and wherein the second communications segment conveys modulation symbol values of a coded user data block throughout the entire second communications segment.

22. A base station, comprising:
a downlink segment rate option determination module enabled to determine a downlink transmission data rate option to be used for transmitting user data in downlink communications segments; and
an assignment signal rate option encoding module enabled to encode data rate option information in an assignment signal indicating the data rate option used for a downlink channel segment corresponding to the assignment signal being encoded or information indication that the data rate option is included in an information block included in the downlink segment corresponding to the assignment signal being encoded.

23. The base station of claim 22, further comprising: a user data encoding and mapping module supporting a plurality of data rate options; and a non-user data information encoding and mapping module supporting at least two different formats for indicating the data rate option used for a corresponding downlink segment for which a data rate option is indicated within the corresponding downlink segment.

24. The base station of claim 23, further comprising: a transmission module for transmitting downlink segment assignment signals and encoded signals in assigned downlink segments.

25. The base station of claim 24, wherein the at least two different formats for indicating the data rate option used for a corresponding downlink segment include a first format which uses a single bit rate option indicator; and wherein the second format uses a multi-bit rate option indicator.

26. The base station of claim 25, wherein the user data encoding and mapping module supports at least two different types of segment utilization, a first type of segment utilization including use of each transmission unit of a segment to convey encoded user data; and
a second type of segment utilization wherein said segment is partitioned into a first portion used to communicate encoded data rate option information but no user data and a second portion used to communicate encoded user data.

27. A method of operating a base station, the base station in communication with a wireless terminal, the method comprising:
for each of a plurality of downlink communication segments to be transmitted from the base station:
i) selecting a data rate option corresponding to one of a plurality of different data rate option groupings, each of said different data rate option groupings corresponding to a different data rate option indicator encoding method, a first grouping in said plurality of groupings corresponding to a first data rate option indicator encoding method wherein the selected data rate option is indicated in an assignment signal separate from the communications segment to be transmitted, a second grouping in said plurality of groupings corresponding to a second data rate option indicator encoding method in which data rate option information is included in the communications segment to be transmitted; and
ii) transmitting an assignment signal indicating assignment of said downlink channel segment being assigned, the downlink channel segment being assigned to a wireless terminal or group of wireless terminals, said assignment signal including encoded rate option information indicating the encoding rate option used to encode user data included in the downlink channel segment being assigned when said selected data rate option is in said first grouping, and said assignment signal indicating that the downlink channel segment being assigned includes data rate option information within the downlink channel segment when said selected data rate option is in said second grouping.

28. The method of claim 27, wherein for each of a plurality of downlink communication segments to be transmitted, the method includes the additional steps of encoding user data according to the selected data rate option; and transmitting the encoded user data in the assigned downlink channel segment.

29. The method of claim 28, wherein for each of a plurality of downlink communication segments to be transmitted for which the selected data rate corresponds to the second grouping, the method includes the additional steps of:
encoding data rate option information to be included in the assigned downlink channel segment; and transmitting the encoded data rate option information using a first portion of said segment which is different from a second portion of the assigned downlink channel segment used to transmit said encoded user data.

30. The method of claim 29, wherein encoded data rate option information to be included in the assigned downlink channel segment is encoded using a different encoding method than the encoding method used to encode said user data.

31. The method of claim 30, wherein for each of a plurality of downlink communication segments to be transmitted for which the selected data rate corresponds to the second grouping, the method includes the additional steps of: determining the encoding method to be used for said encoded data rate option information based on the selected data rate option to be communicated.

32. The method of claim 31, wherein the step of determining the encoding method includes selecting a first encoding method which encodes a single bit rate option indicator; and wherein a second encoding method encodes a multi-bit rate option indicator.

33. The method of claim 29, wherein for each of a plurality of downlink communication segments to be transmitted for which the selected data rate corresponds to the second grouping, the method includes the additional steps of: modulating said encoded data rate option information using a first modulation method which is different from a modulation method used to modulate said encoded user data.

34. The method of claim 33,
wherein the step of modulating said encoded data rate option information includes using QPSK; and
wherein the encoded user data is modulated using one of QAM16, QAM64 and QAM256.

35. A method of operating a base station, the base station in communication with a wireless terminal, the method comprising:
transmitting from the base station in a first portion of a first communications segment encoded data rate option information over a downlink channel to the wireless terminal;
transmitting from the base station in a second portion of said first communications segment encoded user data over the downlink channel; and
selecting a data rate option, prior to transmitting said first and second portions of said first communications segment, said data rate option corresponding to one of a plurality of different data rate option groupings, each of said different data rate option groupings corresponding to a different data rate option indicator encoding method, a first grouping in said plurality of groupings corresponding to a first data rate option indicator encoding method wherein the selected data rate option is indicated in an assignment signal separate from the communications segment, a second grouping in said plurality of groupings corresponding to a second data rate option indicator encoding method in which data rate option information is included in the communications segment, said data rate option selected for said first communications segment being in said second grouping.

36. The method of claim 35, wherein said first data rate option indicator method uniquely identifies the data rate option selected to be used to encode the user data in a communications segment and wherein when said first data rate option indicator method is used the communications segment for which the option was selected does not include encoded data rate option information.

37. A method of operating a base station, the base station in communication with a wireless terminal, the method comprising:
transmitting from the base station in a first portion of a first communications segment encoded data rate option information over a downlink channel to the wireless terminal;
transmitting from the base station in a second portion of said first communications segment encoded user data over the downlink channel; and
determining the encoding method to be used for said encoded data rate option information based on the data rate option to be communicated, and
wherein encoded data rate option information is encoded using a different encoding method than the encoding method used to encode said user data,
wherein the step of determining the encoding method includes selecting a first encoding method which encodes a single bit rate option indicator, and
wherein a second encoding method encodes a multi-bit rate option indicator.

38. A method of operating a base station, the base station in communication with a wireless terminal, the method comprising:
transmitting from the base station in a first portion of a first communications segment encoded data rate option information over a downlink channel to the wireless terminal;
transmitting from the base station in a second portion of said first communications segment encoded user data over the downlink channel; and
determining the encoding method to be used for said encoded data rate option information based on the data rate option to be communicated, and
wherein encoded data rate option information is encoded using a different encoding method than the encoding method used to encode said user data,
wherein a first encoding method encodes a single bit rate option indicator; and
wherein the step of determining the encoding method includes selecting a second encoding method which encodes a multi-bit rate option indicator.

39. A method of operating a base station, the base station in communication with a wireless terminal, the method comprising:
transmitting from the base station in a first portion of a first communications segment encoded data rate option information over a downlink channel to the wireless terminal;
transmitting from the base station in a second portion of said first communications segment encoded user data over the downlink channel; and
transmitting a first assignment signal communicating a first number of bits used to provide data rate option information corresponding to the first communications segment, said first number of bits being less than the number of bits required to uniquely identify each data rate option in a full set of supported data rate options.

40. The method of claim 39, wherein said assignment signal data rate option information indicates that additional data rate option information is included in the communications segment.

41. The method of claim 40, wherein the data rate option corresponding to said first communications segment is the highest supported data rate option in said full set of supported data rate options.

42. The method of claim 40, further comprising: transmitting a second assignment signal used to assign a second communication segment to said first wireless terminal, the second assignment signal communicating a second number of bits used to provide data rate option information corresponding to the second communications segment, said second number of bits being the same as said first number of bits and being less than the number of bits required to uniquely identify each data rate option in a full set of supported data rate options, said second assignment signal indicating the actual data rate option corresponding to said second communication segment.

43. The method of claim 42, wherein said actual data rate option is the lowest supported data rate option.

44. The method of claim 43, wherein said lowest supported data rate option is a QPSK data rate option.

45. The method of claim 44, wherein said first assignment signal includes a first identifier indicating the wireless terminal or group of wireless terminals to which said first communications segment is assigned; and wherein said second assignment signal includes a second identifier which indicates a wireless terminal or group of wireless terminals to which the second communication segment is assigned.

46. The method of claim 44, further comprising: transmitting the second communications segment including encoded user data.

47. The method of claim 46, wherein the first communications segment and the second communications segment are traffic channel segments.

48. The method of claim 47, wherein the first communications segment and the second communications segment represent the same designated logical segment in a repetitive downlink timing and frequency structure but at different times.

49. The method of claim 48, wherein the first and second communications segments convey the same number of modulation symbols.

50. The method of claim 49, wherein the first communications segment conveys a mixture of modulation symbol values associated with a user data coded block and modulation symbol values associated with non-user data, said modulation symbol values associated with non-user data including data rate option information; and wherein the second communications segment conveys modulation symbol values of a coded user data block throughout the entire second communications segment.

51. A base station, comprising:
  a downlink segment rate option determination module enabled to determine a downlink transmission data rate option to be used for transmitting user data in downlink communications segments;
  an assignment signal rate option encoding module enabled to encode data rate option information in an assignment signal indicating the data rate option used for a downlink channel segment corresponding to the assignment signal being encoded or information indication that the data rate option is included in an information block included in the downlink segment corresponding to the assignment signal being encoded; and
  a user data encoding and mapping module supporting a plurality of data rate options; and a non-user data information encoding and mapping module supporting at least two different formats for indicating the data rate option used for a corresponding downlink segment for which a data rate option is indicated within the corresponding downlink segment.

52. The base station of claim 51, further comprising: a transmission module for transmitting downlink segment assignment signals and encoded signals in assigned downlink segments.

53. The base station of claim 52, wherein the at least two different formats for indicating the data rate option used for a corresponding downlink segment include a first format which uses a single bit rate option indicator; and wherein the second format uses a multi-bit rate option indicator.

54. The base station of claim 53, wherein the user data encoding and mapping module supports at least two different types of segment utilization, a first type of segment utilization including use of each transmission unit of a segment to convey encoded user data; and
  a second type of segment utilization wherein said segment is partitioned into a first portion used to communicate encoded data rate option information but no user data and a second portion used to communicate encoded user data.

55. A base station, comprising:
  a downlink segment rate option determination module enabled to determine a downlink transmission data rate option to be used for transmitting user data in downlink communications segments;
  an assignment signal rate option encoding module enabled to encode data rate option information in an assignment signal indicating the data rate option used for a downlink channel segment corresponding to the assignment signal being encoded or information indication that the data rate option is included in an information block included in the downlink segment corresponding to the assignment signal being encoded; and
  a user data encoding and mapping module supporting a plurality of data rate options; and a non-user data information encoding and mapping module supporting at least two different formats for indicating the data rate option used for a corresponding downlink segment for which a data rate option is indicated within the corresponding downlink segment.

56. The base station of claim 55, further comprising: a transmission module for transmitting downlink segment assignment signals and encoded signals in assigned downlink segments.

57. The base station of claim 56, wherein the at least two different formats for indicating the data rate option used for a corresponding downlink segment include a first format which uses a single bit rate option indicator; and wherein the second format uses a multi-bit rate option indicator.

58. The base station of claim 57, wherein the user data encoding and mapping module supports at least two different types of segment utilization, a first type of segment utilization including use of each transmission unit of a segment to convey encoded user data; and
  a second type of segment utilization wherein said segment is partitioned into a first portion used to communicate encoded data rate option information but no user data and a second portion used to communicate encoded user data.

* * * * *